United States Patent
Luick

(10) Patent No.: US 7,089,370 B2
(45) Date of Patent: Aug. 8, 2006

(54) APPARATUS AND METHOD FOR PRE-FETCHING PAGE DATA USING SEGMENT TABLE DATA

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 10/675,170

(22) Filed: Sep. 30, 2003

(65) Prior Publication Data

US 2005/0071601 A1    Mar. 31, 2005

(51) Int. Cl.
*G06F 12/08* (2006.01)
*G06F 12/10* (2006.01)

(52) U.S. Cl. .............. 711/137; 711/202; 711/203; 711/206; 711/209

(58) Field of Classification Search ........... None
See application file for complete search history.

(56) References Cited

U.S. PATENT DOCUMENTS

| | | | | |
|---|---|---|---|---|
| 6,012,106 A | * | 1/2000 | Schumann et al. | 710/22 |
| 6,134,643 A | * | 10/2000 | Kedem et al. | 711/213 |
| 6,161,166 A | * | 12/2000 | Doing et al. | 711/125 |
| 6,957,315 B1 | * | 10/2005 | Chauvel | 711/207 |

OTHER PUBLICATIONS

David A. Patterson and John L. Hennessy, Computer Architecture A Quantitative Approach, 1996, Morgan Kaufmann Publishers, Inc., Second Edition, 445-446.*

Andrew S. Tanenbaum and Albert S. Woodhull, Operating Systems: Design and Implemention, 1997, Prentice Hall, Second Edition, pp. 343-351.*

* cited by examiner

*Primary Examiner*—Reginald G. Bragdon
*Assistant Examiner*—Shawn Gu
(74) *Attorney, Agent, or Firm*—Roy W. Truelson

(57) ABSTRACT

A computer system includes a main memory, at least one processor, and at least one level of cache. The system contains at least one segment table having multiple segment entries recording the assignment of segments in an address space. At least some segment table entries include pre-fetch data indicating which portions of a segment should be pre-fetched. Preferably, a segment table entry contains a list of pages for pre-fetching. Preferably, pre-fetching a listed page causes address translation data for the page to be cached in at least one address translation caching structure. Pre-fetching may also cause data contents of the page to be loaded into a cache.

21 Claims, 18 Drawing Sheets

US 7,089,370 B2

APPARATUS AND METHOD FOR PRE-FETCHING PAGE DATA USING SEGMENT TABLE DATA

CROSS-REFERENCE TO RELATED APPLICATION

The present application is related to the following commonly assigned co-pending application, filed on the same date as the present application, which is herein incorporated by reference: Ser. No. 10/675,732, to David A. Luick, entitled "Apparatus and Method for Pre-Fetching Data to Cached Memoly Using Persistent Historical Page Table Data".

FIELD OF THE INVENTION

The present invention relates to digital data processing hardware, and in particular to the design and operation of cached memory and supporting hardware for processing units of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip, and increased clock speed through further size reduction and other improvements continues to be a goal. In addition to increasing clock speeds, it is possible to increase the throughput of an individual CPU by increasing the average number of operations executed per clock cycle.

A typical computer system can store a vast amount of data, and the processor may be called upon to use any part of this data. The devices typically used for storing mass data (e.g., rotating magnetic hard disk drive storage units) require relatively long latency time to access data stored thereon. If a processor were to access data directly from such a mass storage device every time it performed an operation, it would spend nearly all of its time waiting for the storage device to return the data, and its throughput would be very low indeed. As a result, computer systems store data in a hierarchy of memory or storage devices, each succeeding level having faster access, but storing less data. At the lowest level is the mass storage unit or units, which store all the data on relatively slow devices. Moving up the hierarchy is a main memory, which is generally semiconductor memory. Main memory has a much smaller data capacity than the storage units, but a much faster access. Higher still are caches, which may be at a single level, or multiple levels (level 1 being the highest), of the hierarchy. Caches are also semiconductor memory, but are faster than main memory, and again have a smaller data capacity. One may even consider externally stored data, such as data accessible by a network connection, to be even a further level of the hierarchy below the computer system's own mass storage units, since the volume of data potentially available from network connections (e.g., the Internet) is even larger still, but access time is slower.

Data is moved from mass storage, to main memory, to cache, for use by the processor. Ideally, data is moved into the cache level closest the processor before it is needed by the processor, so that when it is needed, the processor does not have to wait for a relatively long latency data access to complete. However, since the capacity of any of the cache levels is only a small fraction of the capacity of main memory, which is itself only a small fraction of the capacity of the mass storage unit(s), it is not possible to simply load all the data into the cache. Some technique must exist for selecting data to be stored in cache, so that when the processor needs a particular data item, it will probably be there.

A cache is typically divided into units of data called lines, a line being the smallest unit of data that can be independently loaded into the cache or removed from the cache. In simple cache designs, data is loaded into a cache line on demand, i.e. upon the occurrence of a cache miss. I.e., when the processor needs some piece of data which is not in the cache (a cache miss), the required data is obtained from a lower level of cache, or from memory, and loaded into a cache line. This necessarily means that an existing line of cache data must be selected for removal. Various techniques and devices exist for selecting an existing cache line for removal.

Loading on demand is conceptually simple, but results in a high number of cache misses, and resultant idle time while the processor waits for the necessary data. Accordingly, many sophisticated processor designs employ some form of pre-fetching of cache data. Pre-fetching simply means that a predictive technique exists whereby data which is considered likely to be needed soon is loaded into one or more of the cache levels, before the processor actually requires the data. If the predictive technique is accurate and timely, data will be in the L1 cache before an L1 cache miss occurs, or in some other level of cache from which it can be accessed much faster than from main memory.

Several known pre-fetching techniques exist, which can be used alone or in combination. One technique is sequential pre-fetching, i.e., the next sequential line of address space is pre-fetched, on the theory that this is the most likely data needed next. A confirmation bit may be used with sequential pre-fetching, whereby the bit is set on if data in the cache line was actually accessed when it was last pre-fetched into cache and otherwise set off. If the confirmation bit for the next sequential line of data is set on, the line will be pre-fetched to cache.

Another technique involves the use of a branch target buffer. The branch target buffer is a set of branch target addresses, each address associated with a respective cache line. The branch target buffer records the address referenced by the processor immediately after referencing the associated cache line. When a cache line is referenced, its associated branch target address is a good candidate for pre-fetching. The branch target buffer is more general than sequential pre-fetching, since the branch target may be any address, but it requires substantially more overhead to implement.

Yet another pre-fetching technique, known as "technical stream pre-fetching", requires the use of a special technical stream address buffer. Each buffer entry is a list of addresses previously accessed by the processor in sequence. If a first address on the list is referenced by the processor, then the remaining addresses are good candidates for pre-fetching. Like the branch target buffer, this technique involves some overhead to implement.

Although conventional pre-fetching techniques such as these have some predictive value, they are still very limited. It has been observed that in many environments, the processor spends the bulk of its time idling on cache misses. Substantial performance improvement would be possible with more accurate and comprehensive pre-fetching techniques, which would significantly reduce the frequency of cache misses.

SUMMARY OF THE INVENTION

A computer system includes a main memory, at least one processor, and at least one level of cache. The system contains at least one segment table having multiple segment entries recording the assignment of segments in an address space. At least some segment table entries include pre-fetch data indicating which portions of a segment are likely to be referenced. A processor uses this data to make pre-fetch determinations.

In the preferred embodiment, a segment table entry includes an associated list of pages within the segment which are likely to be referenced in the future. The pages on the list typically comprise only a small portion of the total addressable space in the segment. When a segment is initially referenced, the pages on the associated list of the segment's entry in the segment table are designated as pre-fetch candidates. A low priority pre-fetch engine, operating in the background, pre-fetches at least some data regarding pre-fetch candidates.

In one aspect of the preferred embodiment, the segment table translates segment identifiers in an effective address space of the executing task to segment identifiers in a global virtual address space. A page table translates segment identifiers and page number in the virtual address space to real page identifiers in physical memory. Pre-fetching a page within a segment causes data from a page table entry identifying the corresponding real page in physical memory to be cached in at least one address translation caching structure. Pre-fetching may additionally or alternatively cause some or all of the data contents of a page to be loaded into at least one cache.

In another aspect of the preferred embodiment, the pre-fetch candidates in a segment table entry are automatically determined by the system using historical reference data. Specifically, an up or down page counter indicates the frequency of reference to a page or other sub-unit of a segment when pre-fetched. If a pre-fetch action is taken with respect to a page or other sub-unit, and the page is subsequently referenced by the processor, then the reference counter is incremented; if the pre-fetch action is taken but the page is not referenced, the reference counter is decremented. The reference counter thus expresses an approximate likelihood, based on recent history, that the page or other sub-unit will be referenced in the near future.

In the preferred embodiment, pre-fetching sub-units of a segment based segment table data as described herein is used in conjunction with pre-fetching cacheable sub-units of a page to cache based on reference history data associated with individual pages in a page table. The use of a page table is the subject of related co-pending application Ser. No. 10/675,732 to David A. Luick, entitled "Apparatus and Method for Pre-Fetching Data to Cached Memory Using Persistent Historical Page Table Data", filed on the same date as the present application. However, the present invention may be used independently of any such technique for pre-fetching portions of a page based on history in a page table.

Among the advantages of the present invention is the fact that segment table data is long lived, and can even be stored in storage. A record of likely pages to be references, built over time, improves the scope and accuracy of predictive pre-fetching of data. A pre-fetching technique in accordance with the preferred embodiment of the present invention can thus significantly reduce the frequency of cache mises and resultant idle time of the processor. Such a technique involves a comparatively small cost in terms of additional memory resources and control structures required for implementation.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
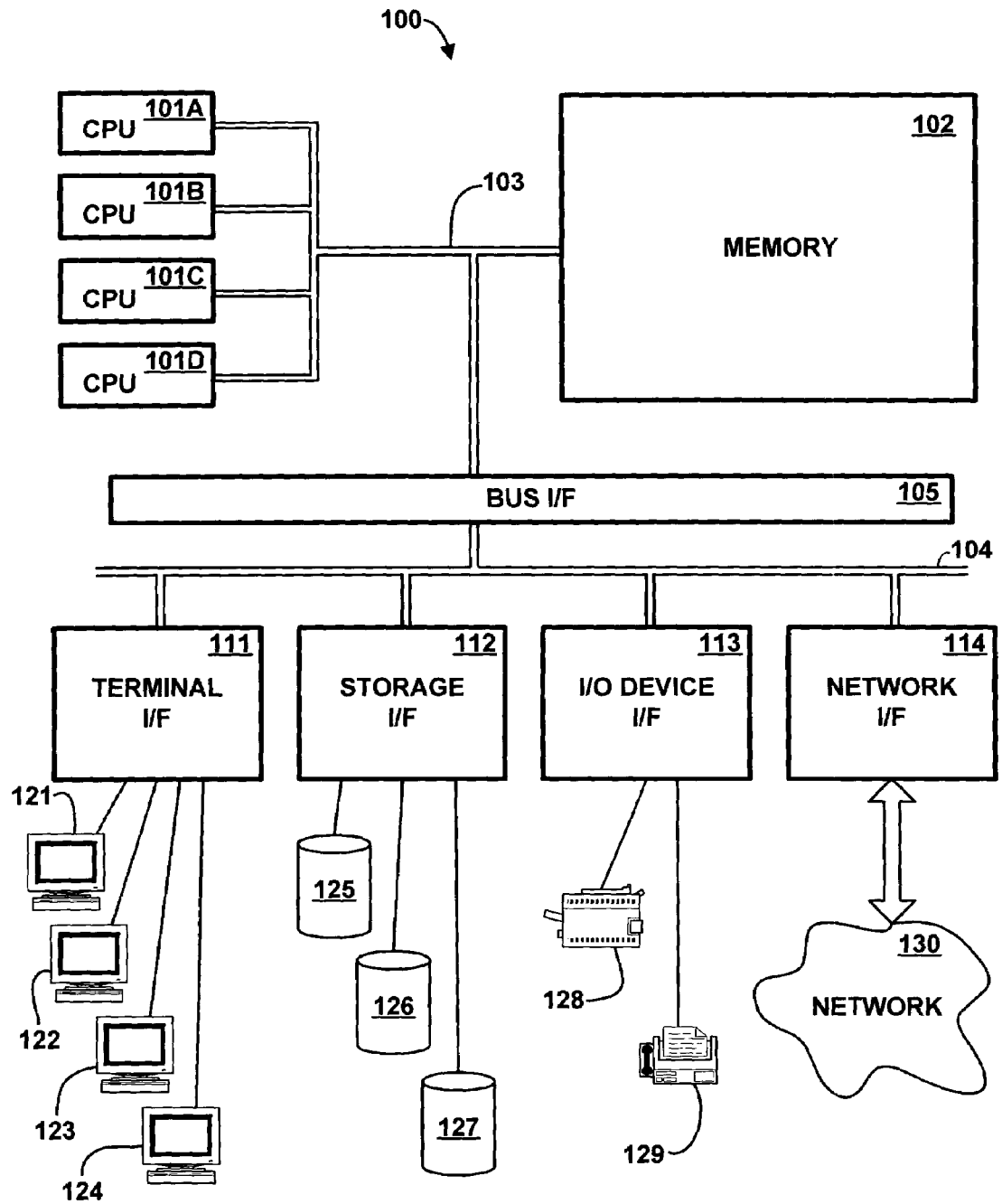
FIG. 1 is a high-level block diagram of the major hardware components of a computer system utilizing cache pre-fetching based on persistent historical page table data, according to the preferred embodiment of the present invention.

Referring to the Drawing, wherein like numbers denote like parts throughout the several views, FIG. 1 is a high-level representation of the major hardware components of a computer system 100 utilizing cache pre-fetching based on persistent historical page table data, according to the preferred embodiment of the present invention. The major components of computer system 100 include one or more central processing units (CPU) 101A–101D, main memory 102, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A–101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and data are loaded into one or more levels of cache (not shown in FIG. 1) for processing. Memory 102 is a random-access semiconductor memory for storing data and programs. Memory 102 is conceptually a single monolithic entity, it being understood that memory is actually a more complex arrangement, including caches and other memory devices.

Memory bus 103 provides a data communication path for transferring data among CPUs 101, main memory 102 and I/O bus interface unit 105. I/O bus interface 105 is further coupled to system I/O bus 104 for transferring data to and from various I/O units. I/O bus interface 105 communicates with multiple I/O interface units 111–114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–124. Storage interface unit 112 supports the attachment of one or more direct access storage devices (DASD) 125–127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory 102 in fact includes at least one level, and preferably multiple levels, of cache, as explained further herein. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPUs 101 main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
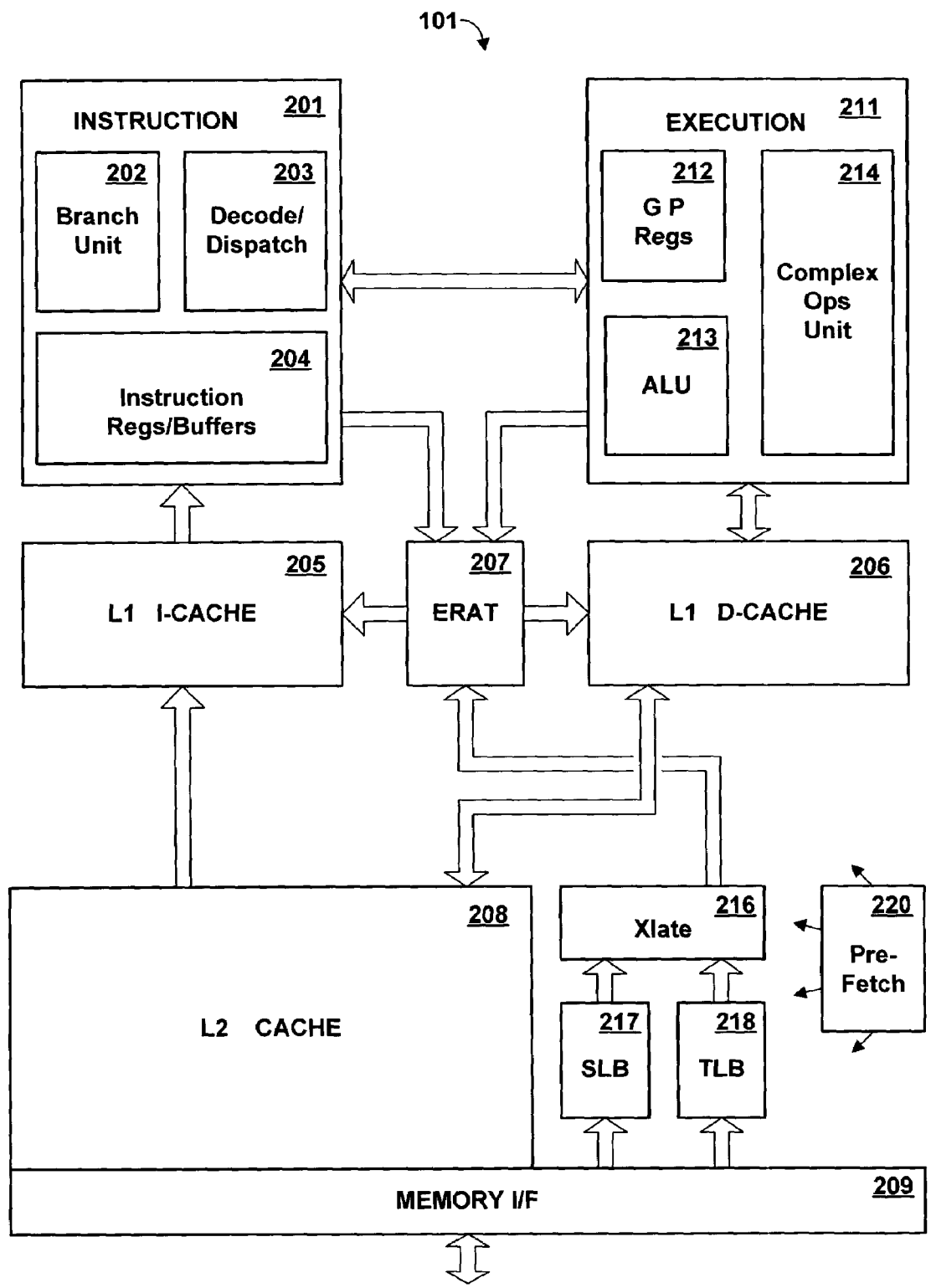
FIG. 2 is a high-level diagram of the major components of a CPU in the computer system of the preferred embodiment.

FIG. 2 is a high-level diagram of the major components of CPU 101 including certain associated cache structures, according to the preferred embodiment, showing CPU 101 in greater detail than is depicted in FIG. 1. In this embodiment, the components shown in FIG. 2 are packaged in a single semiconductor chip. CPU 101 includes instruction unit portion 201, execution unit portion 211, Level 1 Instruction Cache (L1 I-Cache) 205, Level 1 Data Cache (L1 D-Cache) 206, Effective-to-Real Address Table (ERAT) 207, Level 2 Cache (L2 Cache) 208, memory interface 209, address translation hardware 216, segment look-aside buffer (SLB) 217, translation look-aside buffer (TLB) 218, and pre-fetch engine 220. In general, instruction unit 201 obtains instructions from L1 I-cache 205, decodes instructions to determine operations to perform, and resolves branch conditions to control program flow. Execution unit 211 performs arithmetic and logical operations on data in registers, and loads or stores data from L1 D-Cache. L2 Cache 208 is a level 2 cache, generally larger that L1 I-Cache or L1 D-Cache, providing data to L1 I-Cache 205 and L1 D-Cache 206. L2 Cache 208 is coupled to external memory interface 209, which loads data from or stores it to an external memory location, such as an L3 cache or main memory 102.

ERAT 207 is an addressing cache providing address translation for certain data in the other cache structures. Address translation data in SLB 217 and TLB 218 is accessed and translated by translation hardware 216 to construct address translation entries in ERAT 207. The operation of these units is more fully explained herein.

Instruction unit 201 comprises branch unit 202, instruction decode/dispatch unit 203, and instruction registers and buffers 204. Instructions from L1 I-cache 205 are loaded into buffers 204 prior to execution. Depending on the CPU design, there may be multiple buffers (e.g., one for a sequential series of instructions, and others for branch-to locations), each of which may contain multiple instructions. Decode/dispatch unit 203 receives the current instruction to be executed from one of the buffers, and decodes the instruction to determine the operation(s) to be performed or branch conditions. Branch unit 202 controls the program flow by evaluating branch conditions, and refills buffers from L1 I-cache 205.

L1 I-cache 205 and L1 D-cache 206 are separate instruction and data caches providing data to instruction and execution units. L2 cache is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 208, which in turn obtains it from an external location, and then transferred from L1 cache to the corresponding unit. Depending on the processor design, it may be possible to by-pass L1 cache and load data from L2 cache 208 to an execution or instruction register. Memory bus interface 209 handles the transfer of data across memory bus 103, which may be to L3 cache, main memory or to I/O units via bus interface 105.

Execution unit 211 comprises a set of general purpose registers 212 for storing data and an integer arithmetic logic unit (ALU) 213 for performing arithmetic and logical operations on data in GP registers 212 responsive to instructions decoded by instruction unit 201. Execution unit further includes complex operations subunit 214 for performing mathematically intensive operations, such as floating point operations. Subunit 214 may include its own special registers (not shown). Integer ALU 213 and complex operations subunit 214 are typically implemented as multi-stage pipelines. In addition to components shown in FIG. 2, execution unit may include additional special purpose registers and counters, load and store hardware for fetching data from or storing it to cache or memory, control hardware, and so forth. In particular, execution unit 211 may include pipelines (not shown) in addition to integer ALU and complex operations subunit 214. Additional pipelines, such as an instruction fetch and decode pipeline, may exist within processor 101.

Pre-fetch engine 220 prospectively fetches data into ERAT 207 and caches, before an actual data reference has been generated by an instruction unit or execution unit. Pre-fetch engine 220 uses, among other things, historical reference data to predict which data should be cached. The operation of the pre-fetch engine is described in greater detail herein.

In the preferred embodiment, CPU 101 supports the concurrent execution of multiple (preferably two) threads. A separate set of GP registers 212 (not shown), as well as certain other structures, exists for each thread. However, the number of threads supported may vary, and the present invention could be used in processors supporting only a single thread of execution.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU 101 may have a simple or complex instruction set, which supports the dispatching of a single operation, or multiple operations, with each processor cycle.

L1 caches 205 and 206 and L2 cache 208 are shown in FIG. 2 as part of CPU 101 because each CPU has its own respective L1 and L2 caches. Architecturally, caches may be considered part of memory 102, or may be considered part of the CPU, or may be considered separate entities entirely.

The representation of FIG. 2 is intended to be typical, and is not intended to limit the present invention to any particular physical cache implementation. The processor chip or chips may include more caches or fewer caches than represented in FIG. 2.

Figure 3:
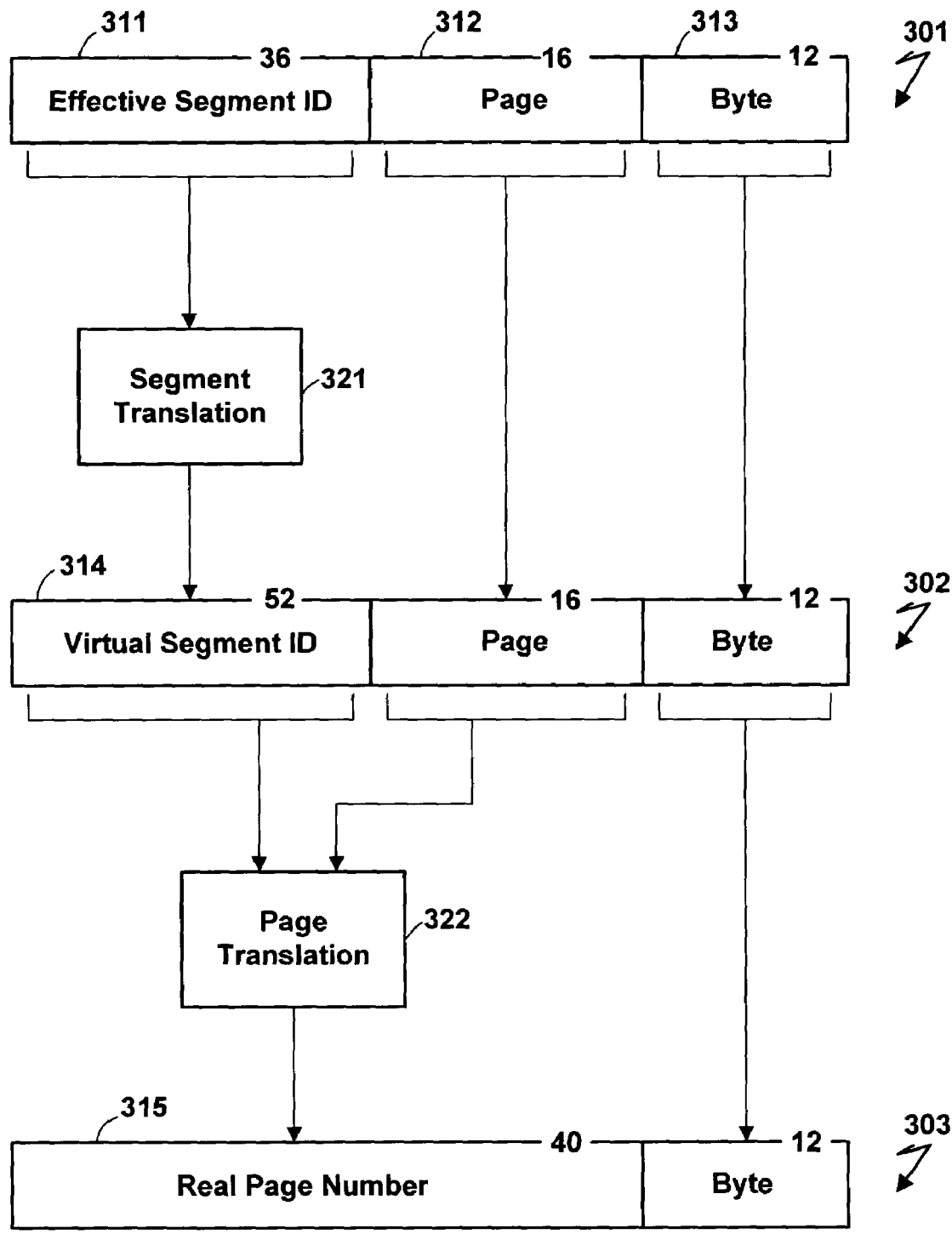
FIG. 3 is a conceptual illustration of different forms of addresses and address translation supported in the computer system of the preferred embodiment.

System 100 of the preferred embodiment supports multiple levels of address translation, as logically illustrated in FIG. 3. The three basic addressing constructs are effective address 301, virtual address 302, and real address 303. An "effective address" is an address from the point of view of the processor's instruction and execution units. I.e., addresses generated by instruction unit 201 or execution unit 211 to reference instructions or data are effective addresses. An effective address may be produced in any of various ways known in the art, e.g., as an address directly encoded in an instruction (which may or may not be concatenated with some high-order address bits in a special-purpose register which changes infrequently, e.g., when execution of a new task is initiated); as a computed offset from an address in a general purpose register; as an offset from the currently executing instruction; etc. In the preferred embodiment, an effective address comprises 64 bits, numbered 0 to 63 (0 being the highest order bit). A "virtual address" is an operating system construct, used to isolate the address spaces of different executing tasks. I.e., if each task may reference the full range of effective addresses, then the effective address spaces of different tasks must be mapped into a larger virtual address space to avoid conflicts. In certain computer system architectures, the virtual address may also be mapped to a location in mass storage for accessing stored data. The virtual address is not a physical entity in the sense of being stored in registers like the effective address; it is a logical construction, resulting from a concatenation of a 52-bit virtual segment ID 314 and the low-order 28 bits of the effective address, a total of 80 bits. A real address represents a physical location in memory 102 where data is stored. The number of real address bits will vary with particular machines, but is generally fewer than the number of effective address bits. In the representation of FIG. 3, the real address contains 52 bits numbered 12 to 63. In the preferred embodiment, the L1, L2 and L3 caches are addressed using real addresses.

As shown in FIG. 3, an effective address 301 comprises a 36-bit effective segment ID 311, a 16-bit page number 312, and a 12-bit byte index 313, the effective segment ID occupying the highest order bit positions. A virtual address 302 is constructed from an effective address by mapping the 36-bit effective segment ID 311 to a 52-bit virtual segment ID 314, and concatenating the resultant virtual segment ID 314 with page number 312 and byte index 313. A real address 303 is derived from the virtual address by mapping the virtual segment ID 314 and page number 312 to a 40-bit real page number 315, and concatenating the real page number with byte index 313. Because a page of main memory contains 4K (i.e, $2^{12}$) bytes, the bye index 313 (lowest order 12 address bits) specifies an address within a page, and is the same whether the address is effective, virtual or real. The higher order bits specify a page, and are therefore sometimes referred to as an "effective page number" or "real page number", as the case may be.

It will be understood that these address range parameters are simply on example of an addressing scheme, which may vary. In particular, a system may support different page sizes, and/or multiple page sizes. Where larger pages sizes are used, it may be desirable to increase the size of the cacheable sub-unit accordingly.

Computer system 100 contains an address translation mechanism for translating effective addresses generated by CPU 101 to real addresses in memory 102 or cache. This address translation mechanism is depicted at a high conceptual level in FIG. 3, and is described in greater detail herein. The address translation mechanism includes a segment translation mechanism 321 (comprising a segment table and segment look-aside buffer) for mapping effective segment ID 311 to virtual segment ID 314, and a page translation mechanism 322 (comprising a page table and translation look-aside buffer) for mapping virtual segment ID 314 and page number 312 to real page number 315.

Figure 4:
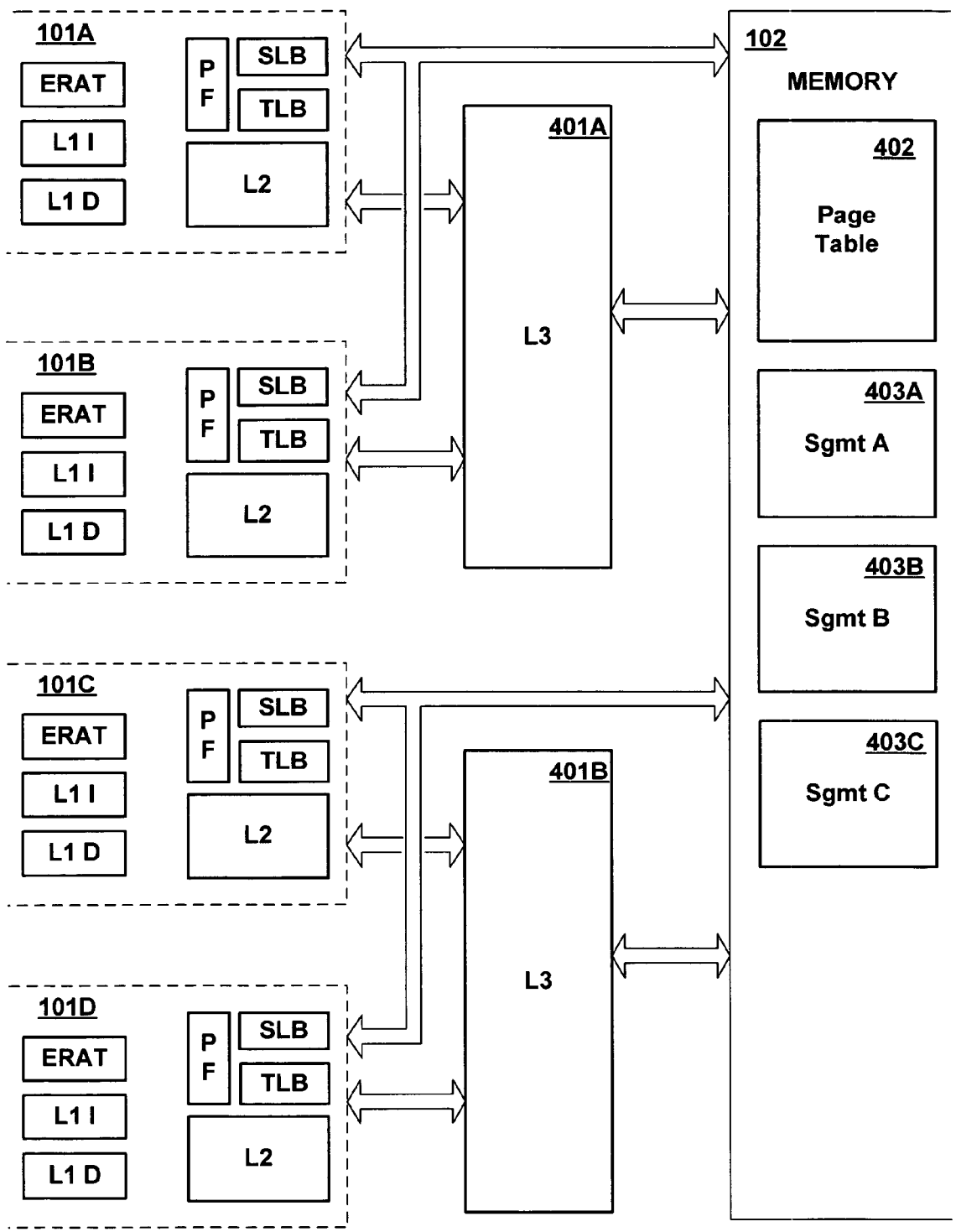
FIG. 4 represents in greater detail the hierarchy of various caches and associated structures for storing and addressing data, according to the preferred embodiment.

FIG. 4 represents in greater detail the hierarchy of various caches and associated structures for storing and addressing data, according to the preferred embodiment. In this embodiment, there are three levels of cache in addition to main memory. Data from main memory is loaded first into level 3 cache (L3 cache) 401A, 401B (herein generically referred to as feature 401), from which it is loaded into L2 cache 208 and ultimately into L1 I-cache 205 or L1 D-cache 206. Depending on the design, it may also be possible to by-pass cache levels when loading data, e.g., to load data from an L3 cache directly into an L1 cache. In the preferred embodiment, an L3 cache 401 is shared among multiple processors, and there may be multiple L3 caches in system 100. Preferably, an L3 cache is shared by up to four processors, although only two are shown in FIG. 4. Physically, the L3 cache is packaged closer to the processor(s) with which it is associated than is main memory. For example, an L3 cache and the processors it services might be packaged on a common printed circuit card, or even on a common integrated circuit chip.

Data from page table 402 or a segment table 403 in memory can be directly loaded into TLB 218 or SLB 217, by-passing the general-purpose caches. It is also possible to load page table data into L3 cache 401, and to fill the TLB from L3 cache. The TLB being significantly larger than SLB, it is often useful to cache TLB data. The SLB is so small that caching SLB data in the L3 cache is unnecessary.

Caches become faster, and store progressively less data, at the higher levels (closer to the processor). In the exemplary embodiment described herein, typical of a large computer system, each L1 cache has a cache line size of 128 bytes, stores 64 KB of data, and requires 3 cycles to access. An L2 cache has a cache line size of 256 bytes, stores 2 MB of data, with an access time of 20 cycles. An L3 has a cache line size of 512 bytes, stores 32 MB of data, with an access time of 100 cycles. Access time to main memory is slower yet, and may approach 1000 cycles. It will be understood, however, that these parameters are merely representative of typical caches in large systems using current technology. These typical parameters could change as technology evolves. Smaller computer systems will generally have correspondingly smaller caches, and may have fewer cache levels. The present invention is not limited to any particular cache size, access times, cache line size, number of cache levels, whether caches at a particular level are shared by multiple processors or dedicated to a single processor, or similar design parameters.

In addition to executable programming code and other data which is manipulated by applications programs, memory 102 includes certain data structures for supporting address translation. Specifically, memory includes page table 402 and multiple segment tables 403A–403C (herein generically referred to as feature 403). Three segment tables are illustrated in FIG. 4, it being understood that the number of segment tables may vary, and is typically much larger.

Page table 402 is used to record the assignment of virtual address ranges to real pages currently in main memory 102. Page table 402 further contains data required for supporting operating system paging algorithms and other functions. In particular, page table 402 contains reference history data for cacheable sub-units of the page to support pre-fetching, as explained in greater detail herein. A segment table 403 records the assignment of segment IDs in an effective address to segment IDs in a virtual address. Since each executing task has its own mapping of effective addresses to virtual addresses, and effective addresses of different tasks may overlap (although virtual addresses are unique, and do not overlap), each task has its own segment table 403.

In operation, each SLB 217 caches information from the segment table(s) 403 corresponding to the task(s) being executed by the processor in which the SLB is located, for translating an effective address to a virtual address. Each TLB 218 caches information from page table 402, for translating a virtual address to a real address. The ERAT 207 is a higher level addressing cache, containing entries directly translating an effective address to a real address. These entries are constructed using information from both the TLB 218 and SLB 217

Figure 5:
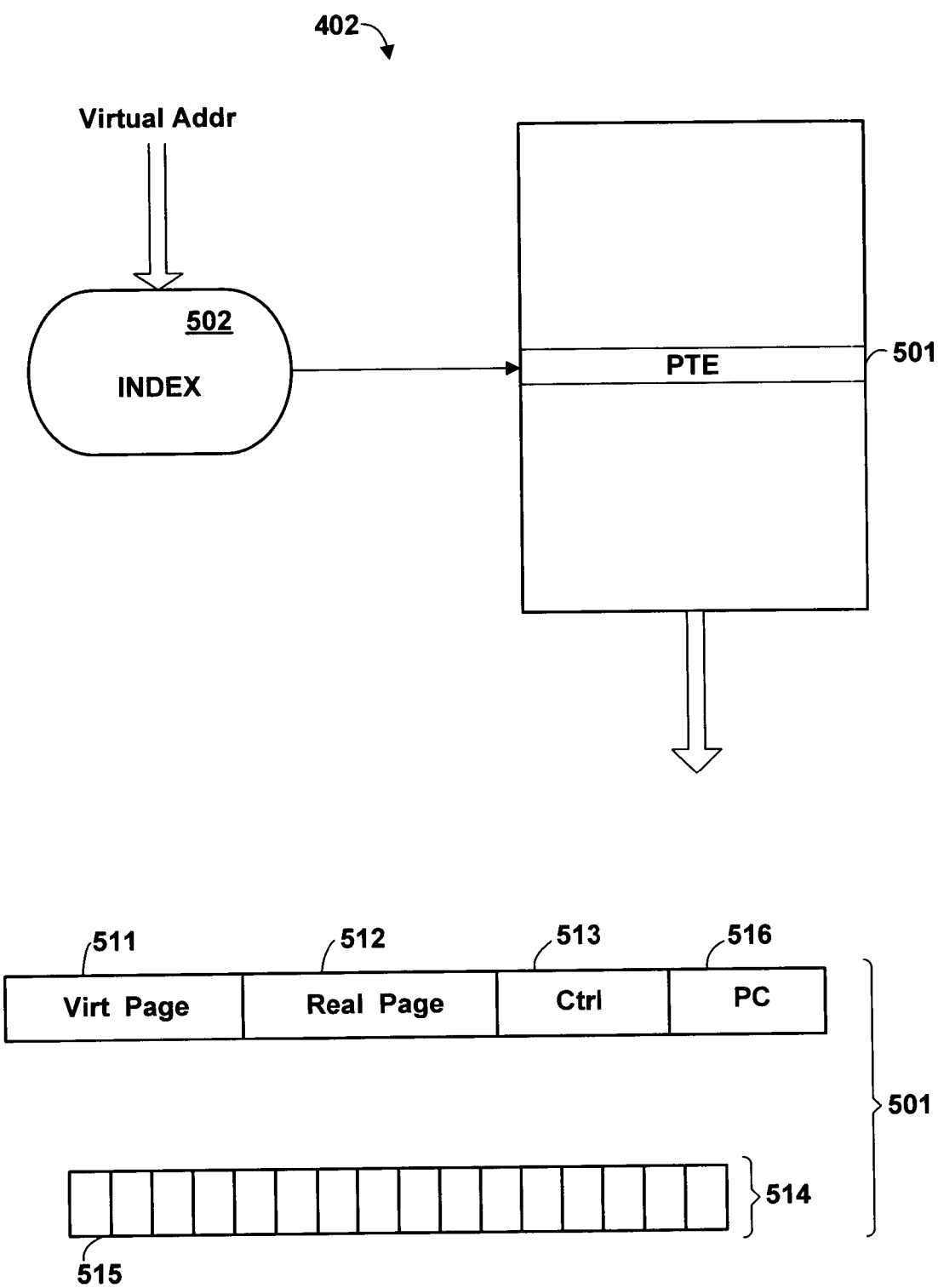
FIG. 5 represents the structure of a page table containing historical reference data for cacheable sub-units of a page, according to the preferred embodiment.

FIG. 5 is a representation of the structure of page table 402, showing certain significant components including historical reference data for cacheable sub-units of a page. Referring to FIG. 5, page table 402 contains a plurality of page table entries (PTE) 501. In operation, the page table is used to supply a real page number 315 in response to an input virtual page number (i.e., the concatenation of a virtual segment ID 314 and page number 312). An index mechanism 502 determines the page table entry corresponding to an input virtual page number portion of a virtual address. The details of operation of the index mechanism are not pertinent to the present invention, and any form of page table indexing, now known or hereafter developed, could be used.

Each page table entry contains a virtual page number field 511, a real page number field 512, various additional control and maintenance data 513, an array of cache line reference counters 514, and a page reference counter 516. Each counter 515 within array 514 is a 3-bit counter corresponding to a respective cacheable sub-unit of the real page referenced by the page table entry. In the preferred embodiment, where the page size is 4 KB, each array 514 contains 16 counters 515, each counter corresponding to a cacheable sub-unit of 256 bytes. For example, the first 3-bit counter 515 in array 514 corresponds to the byte address range (range of a byte address 313 within the page) '000'X to '0FF'X, the second 3-bit counter in array 514 corresponds to byte address range '100'X to '1FF'X, and so on. It will be observed that, in this embodiment, the cacheable sub-unit size is the same as the line size of the L2 cache. However, the cacheable sub-unit could be larger or smaller, and could be the line size of the L1 cache, the L3 cache, or some larger size. Page reference counter 516 is a counter (preferably 3 bits) corresponding to the page as a whole.

Counters 515 and 516 express a historical data reference pattern. In the preferred embodiment, each counter is an up-or-down counter, which is incremented upon the occurrence of certain events and decremented upon the occurrence of other events. The counter can not be incremented past its higher limit (e.g., '111'B) or decremented below its lower ('000'B) limit. Preferably, a line reference counter 515 is incremented if the corresponding cache line is demand loaded into cache as a result of a cache miss, or if the corresponding cache line is pre-fetched into cache and later accessed from the cache. The line reference counter is decremented if the corresponding cache line is pre-fetched into cache, but is not accessed by the processor before being deleted from cache. The page reference counter 516 is incremented if there is an ERAT miss for the page, or if an entry for the page is pre-fetched into the ERAT and later used to reference data. The page reference counter is decremented if a page entry is pre-fetched into the ERAT, but not used. Thus, the counters serve as a feedback mechanism, which "reward" correct pre-fetch guesses by incrementing a counter, and "punish" incorrect guesses by decrementing a counter.

In the preferred embodiment, all increments and decrements are by one, but other values could be used to adjust the amount of pre-fetching. For example, if the increment is greater than the decrement amount, counts will tend to be higher and more lines or pages will meet the criteria for pre-fetching, while if the increment is less than the decrement amount, fewer lines or pages will meet the criteria.

Preferably, line reference counters 515 are initialized to zero when a page table entry is created in memory. It would optionally be possible to save these to storage when a page table entry is deleted (the underlying page is paged out), and retrieve them from storage when a new entry is created for the same virtual memory space. However, due to the rapidly changing nature of many reference patterns, particularly when referencing commercial transaction data, it is not clear that there would be sufficient additional benefit in saving these numbers to justify the additional storage accesses. Page reference counters 516 are initialized to the value of a corresponding page counter 718 in an array 716 of the segment table, if one exists; if no such entry exists, the page counter is also initialized to zero.

Figure 6:
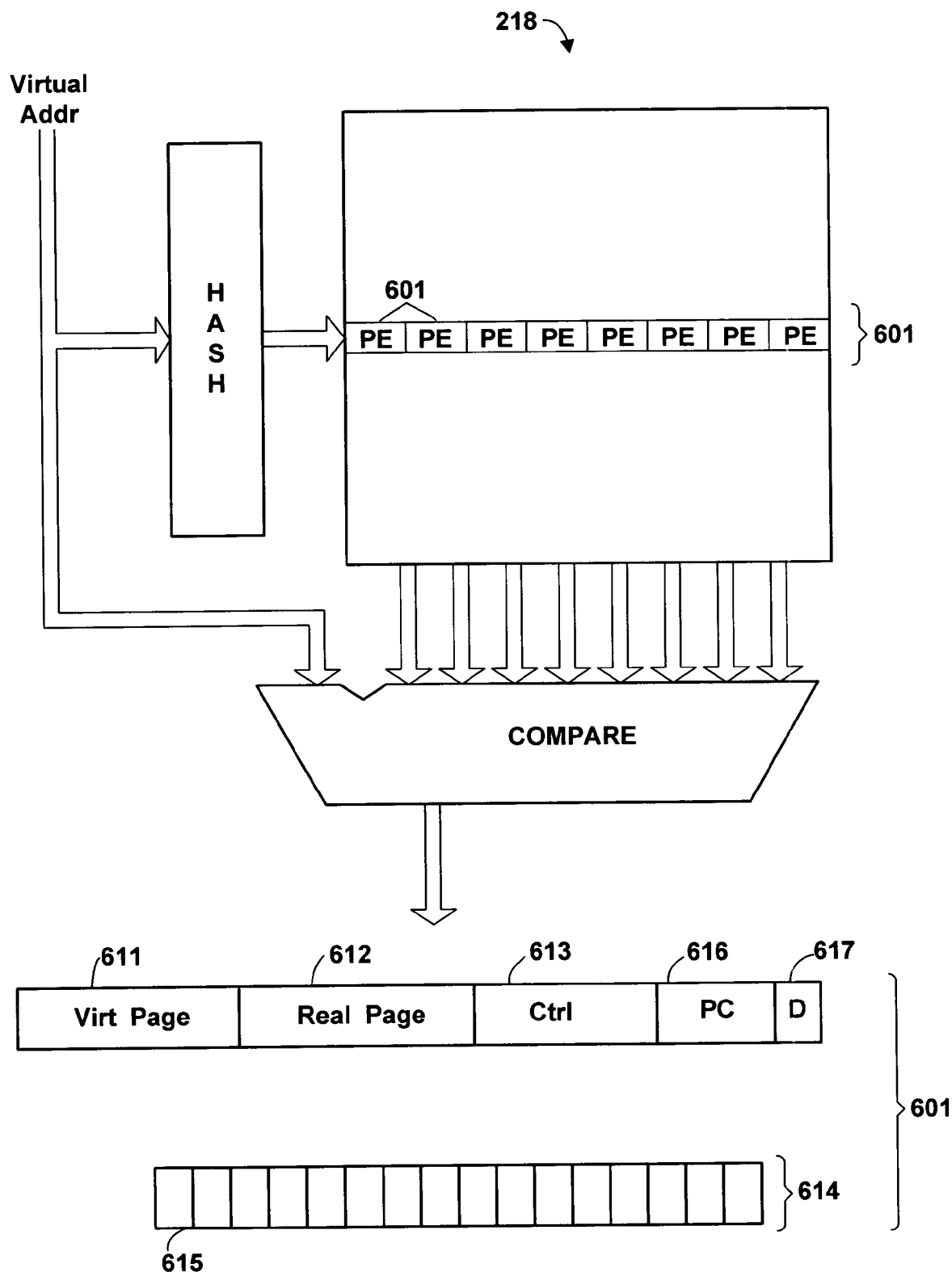
FIG. 6 represents the structure of a translation look-aside buffer (TLB) containing historical reference data for cacheable sub-units of a page, according to the preferred embodiment.

FIG. 6 is a representation of the structure of TLB 218. TLB is essentially a cache of certain page table data. Referring to FIG. 6, TLB 218 contains a plurality of page address entries (PE) 601, arranged in rows 602 which are addressed using a hash function of the virtual address. Typically, the hash function includes some number of low order bits of the virtual page number. The number of entries 601 in each row 602 is the associativity of the TLB. In the preferred embodiment, TLB 218 has an associativity of 8, it being understood that this number could vary.

Each entry 601 contains a virtual page number field 611, a real page number field 612, various additional control and maintenance bits 613 (such as least-recently-used (LRU) bits for determining which entry to cast out when it is necessary to load a new entry), an array of line reference counters 615, a page reference counter 616, and a dirty bit 617. Typically, virtual page number 611 contains only that portion of the virtual page number which does not include the bits used in the hash function, since those bits are redundant. A page entry corresponding to a virtual address is determined by selecting a TLB row using the hash value, and comparing the virtual page numbers 611 of each selected entry to the remaining bits of virtual address to find the correct entry. If none of the entries compares, the address is not in the TLB (a TLB miss) and must be loaded from main memory (or cache). Although a commonly used associative indexing scheme is shown in FIG. 6 (and similarly in FIGS. 8, 9 and 10), and method of indexing could be used.

Each line reference counter 615 within array 614 is a 3-bit counter corresponding to a respective cacheable sub-unit of the real page referenced by the page entry. Counters 615 and 616 are obtained from the corresponding page table entry in page table 402 when the page entry is loaded into TLB 218, and have the same significance as the counters 515 and 516, respectively, within the page table entry.

Figure 7:
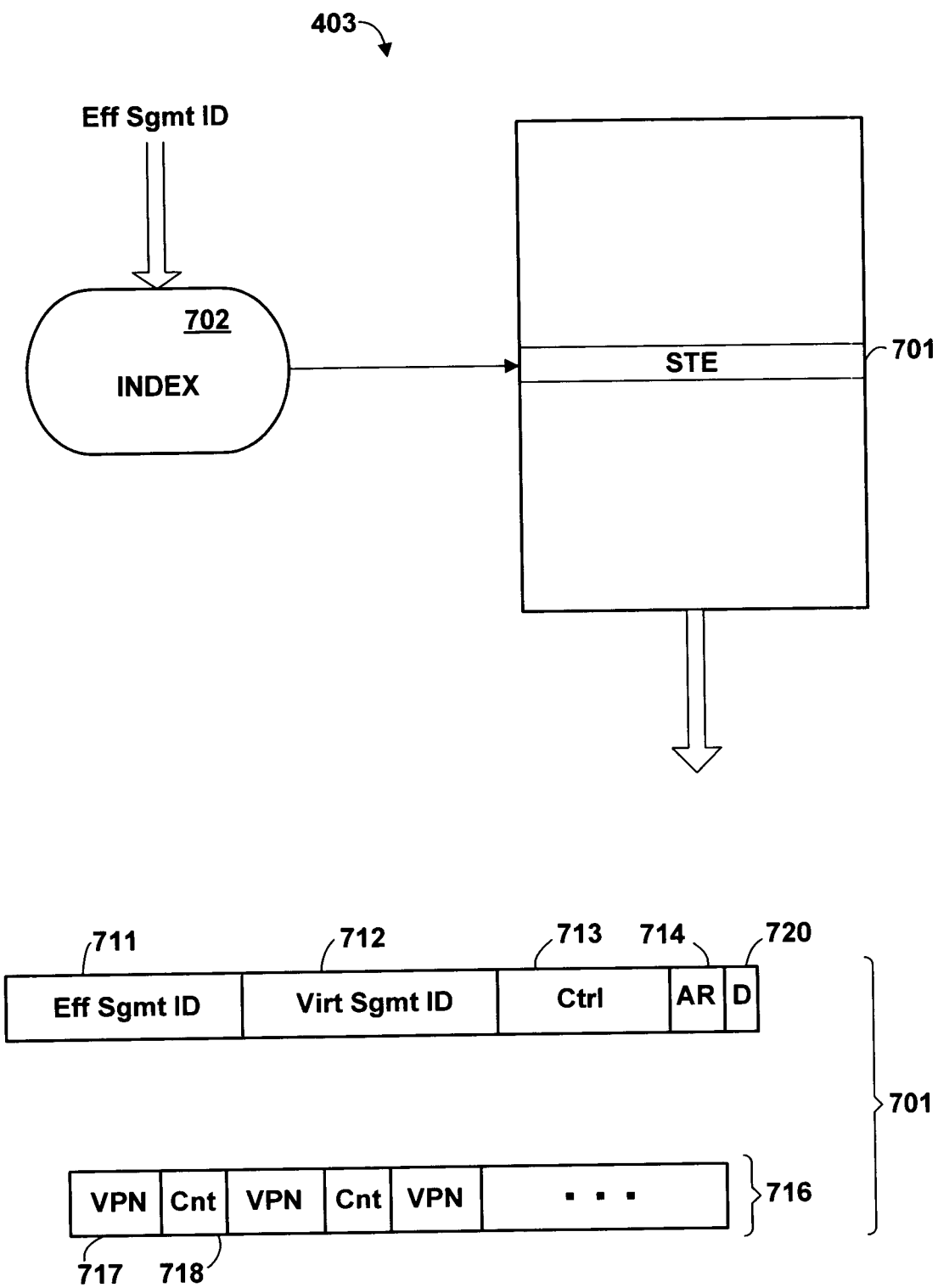
FIG. 7 represents the structure of a segment table containing historical page reference data, according to the preferred embodiment.

FIG. 7 is a representation of the structure of a segment table 403 in memory, showing certain significant components including historical reference data for selective pages within a segment. In the preferred embodiment, a separate segment table 403 exists for each task executing in system 100. Referring to FIG. 7, segment table 403 contains a plurality of segment table entries (STE) 701. In operation, the segment table is used to supply a virtual segment ID 314 in response to an input effective segment ID which is associated with the executing task to which segment table 403 corresponds. An index mechanism 702 determines the segment table entry 710 corresponding to an input effective segment ID. The details of operation of the index mechanism are not pertinent to the present invention and any form of indexing could be used.

Each segment table entry 701 contains an effective segment ID field 711, a virtual segment ID field 712, various additional control and maintenance data 713, an automatic reference enable bit 714, a dirty bit 720, and a page reference history array 716. Array 716 contains multiple page numbers 717 (each 16 bits) and respective corresponding page reference counters 718. Each page reference counter 718 is preferably a 3-bit counter.

The page numbers 717 in array 716 represent potential pre-fetch target pages within the virtual segment ID corresponding to the segment table entry. When a segment table entry is initially demand accessed, a pre-fetch of the page numbers in the array is initiated, as explained more fully herein. The page reference counters have the same significance as page reference counters 516 in the page table, and may be used for segment table maintenance and/or pre-fetch decisions.

The array of page numbers in the segment table entry can be analogized to the cacheable sub-units of a page in a page table entry. However, unlike the cacheable sub-units, the list of page numbers is very sparse. I.e., there are 64K pages in each segment, but only a small fraction of these pages is represented in array 716. A typical task accesses a relatively small number of pages in each segment, e.g. 10–20 pages. The list of pages in array 716 is intended to represent this small subset of the page numbers. Ideally, array 716 contains all page numbers used by the task. However, it is difficult to implement the segment table without putting some fixed limit on the size of array 716, which necessarily means that, for some tasks, array 716 might not include all pages used by the task. In the preferred embodiment, array 716 contains 8 page numbers and 8 corresponding page reference counters. Preferably, the array of page numbers is stored in storage with other segment table data, and paged into memory when the segment table is created or filled. The page array thus has a long lifespan.

The list of pages number in array 716 can be automatically maintained by processor 101, or maintained by some user-defined software algorithm. The segment table being just a data structure in memory, it can be altered by software. A user may wish to perform his own analysis of task execution to determine which pages are likely to be referenced. In the case of database and similar data, such analysis is generally impractical, but in the case of program instructions, analysis of typical execution paths may provide an accurate prediction of pages to be accessed, from which the list of pages in array 716 could be generated. If the user generates such a list, he may wish to prevent the processor from altering it. Automatic reference enable bit 714 is used to specify automatic maintenance of array 716 by the processor. Where this bit is set off, the processor will not change entries in array 716. When the bit is set on, the processor will automatically update array 716 according to the perceived reference pattern. Briefly, the processor initially loads array 716 with the first 8 pages which are demand loaded into cache. Subsequently, any time a new page is demand loaded into the ERAT, its page reference counter is compared with the page reference counters of the pages in the array, and it replaces a page having a lower reference count. This procedure is described in greater detail herein.

Figure 8:
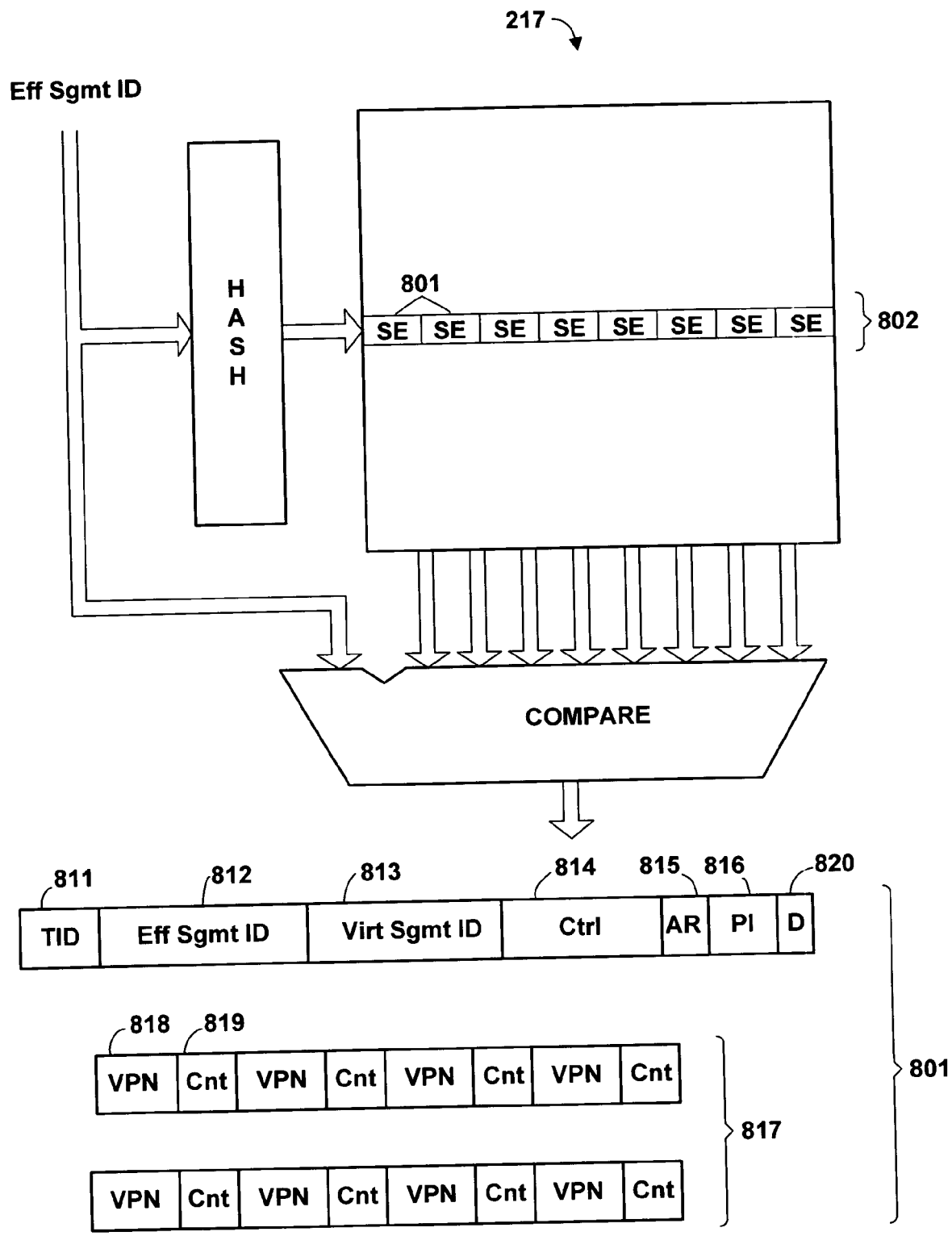
FIG. 8 represents the structure of a segment look-aside buffer (SLB) containing historical page reference data, according to the preferred embodiment.

FIG. 8 is a representation of the structure of SLB 217. SLB is essentially a cache of certain data from segment tables 403. Referring to FIG. 8, SLB 217 contains a plurality of segment ID entries (SE) 801, arranged in rows 802 which are addressed using a hash function of the effective segment ID. Typically, the hash function includes some number of low order bits of the effective segment ID. The number of entries 801 in each row 802 is the associativity of the SLB. In the preferred embodiment, SLB 217 has an associativity of 8, it being understood that this number could vary.

Each entry 801 contains a thread ID field 811, an effective segment ID field 812, a virtual segment ID field 813, various additional control and maintenance data 814 (such as LRU bits for determined which entry to cast out when it is necessary to load a new entry), an automatic reference enable bit 815, a page index pointer 816, a dirty bit 820, and a page reference history array 817. Effective segment ID 812 contains only that portion of the ID which was not used in the hash function, since those bits are redundant. A segment ID entry corresponding to an input effective segment ID is determined by selecting an SLB row using the hash value, and comparing the thread ID 811 and effective segment ID 812 of each entry in the selected row to the ID of the thread which generated the reference and the remaining bits of effective segment ID of the reference. If none of the entries compares, the address is not in the SLB (an SLB miss) and must be loaded from a segment table in main memory.

Page reference history array 817 contains a set of page numbers 818 within the virtual address segment and corresponding page reference counters 819. Page numbers 818 and counters 819 are copied from the corresponding segment table entry in a segment table 403 when the segment entry 801 is initially loaded in SLB 217, and have the same significance as page numbers 717 and counters 718, respectively, within the segment table entry.

Figure 9:
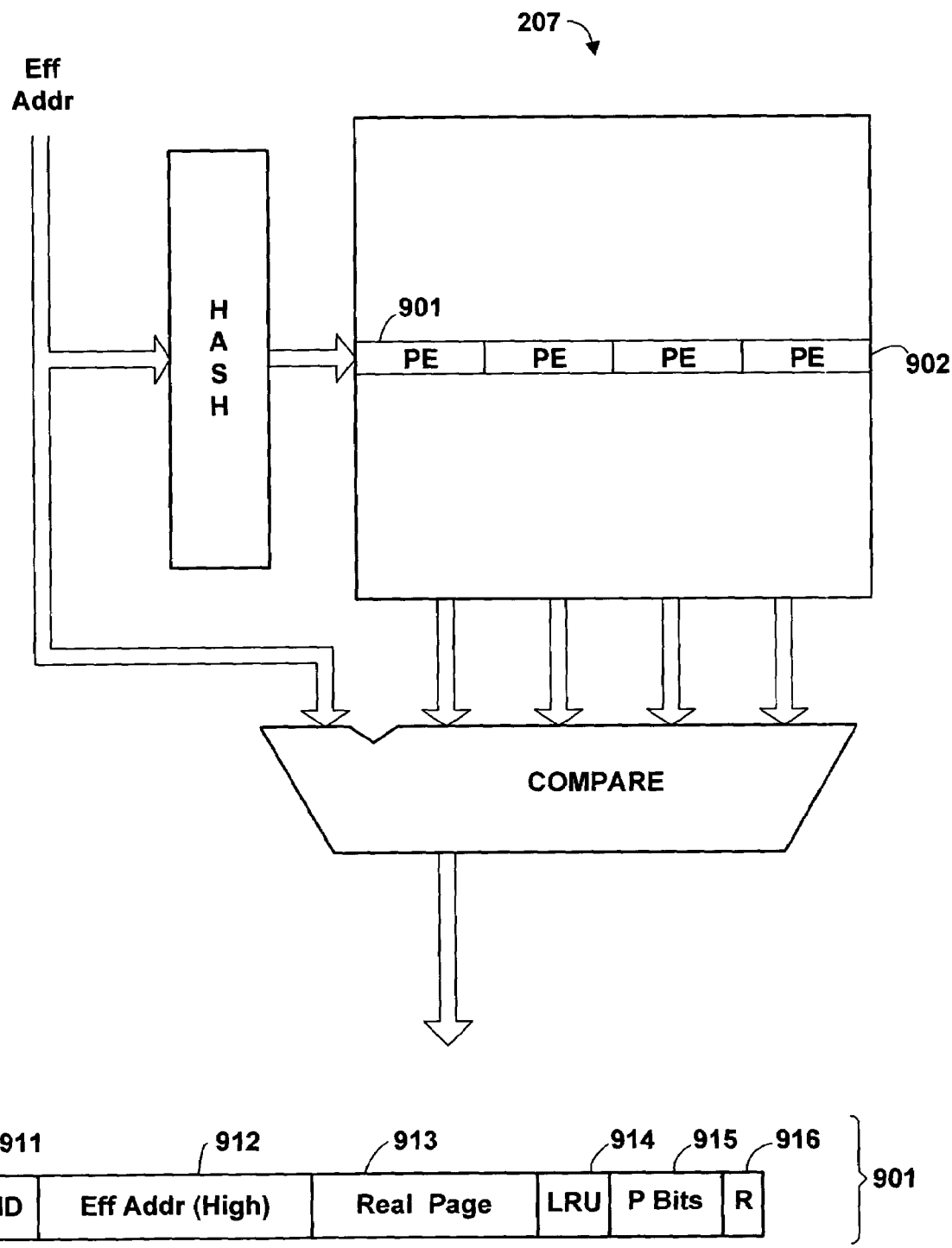
FIG. 9 represents the structure of an effective-to-real address table (ERAT) containing pre-fetch indicators, according to the preferred embodiment.

FIG. 9 is a representation of the structure of ERAT 207. ERAT 207 is a cached translation of effective addresses to real addresses, which is derived from SLB 217 and TLB 218. Like SLB 217 and TLB 218, ERAT 207 is an associative cache which is addressed using a hash function. Referring to FIG. 9, ERAT 207 contains a plurality of page address entries (PE) 901, arranged in rows 902 which are addressed using a hash function, the hash function typically including some number of low order bits of the effective page number. Preferably, ERAT 207 has an associativity of 4, it being understood that this number could vary.

Each entry 901 contains a thread ID field 911, an effective page number field 912, a real page number field 913, LRU bits 914 used for determining which entry to cast out, an an array of pre-fetch bits (P bits) 915, and a single page reference bit 916. Preferably, a single ERAT 207 is shared by all threads concurrently executing in processor 101, and since effective address spaces of different threads may overlap, thread ID 911 is required to identify the thread to which an ERAT entry corresponds. In the 2-thread processor of the preferred embodiment, thread ID 911 is a single bit. It will be understood that it would alternatively be possible to use separate ERATs for each thread, in which case a thread ID would be unnecessary. Preferably, effective page number field 912 contains only that portion of the effective page number which does not include the bits used in the hash function, since those bits are redundant. A page entry corresponding to an effective address is determined by selecting an ERAT row 902 using the hash value, and comparing the effective page numbers 912 of each selected entry to the remaining bits of effective address to find the correct entry. If none of the entries compares, the address is not in the ERAT (an ERAT miss) and must be loaded from TLB and SLB (or from tables in main memory).

A single respective P bit in array 915 corresponds to each cacheable sub-unit within the real page referenced by the page entry. The P bit is used to determine whether to pre-fetch the corresponding cacheable sub-unit (which is equivalent to a single cache line of the L2 cache). The bit is set to an appropriate value when the page entry is loaded into the ERAT, and is not changed while in the ERAT. The bit is set to 1 (indicating data should be pre-fetched) if the counter 615, corresponding to the same cacheable sub-unit within the TLB entry 601 from which the ERAT page entry was derived, equals or exceeds some threshold. In a simple embodiment, the threshold is fixed at 1, so that any time the counter is non-zero, the corresponding P-bit will be set, indicating that the cacheable sub-unit should be pre-fetched. However, the threshold could alternatively be variable.

Page reference bit 916 is used to record whether an ERAT page address entry 901 has actually been referenced, i.e., whether the processor has generated any reference to an address within the effective page to which the ERAT page address entry corresponds. Page reference bit 916 is set to 0 when the entry is loaded into the ERAT, and subsequently updated on a data reference.

Figure 10:
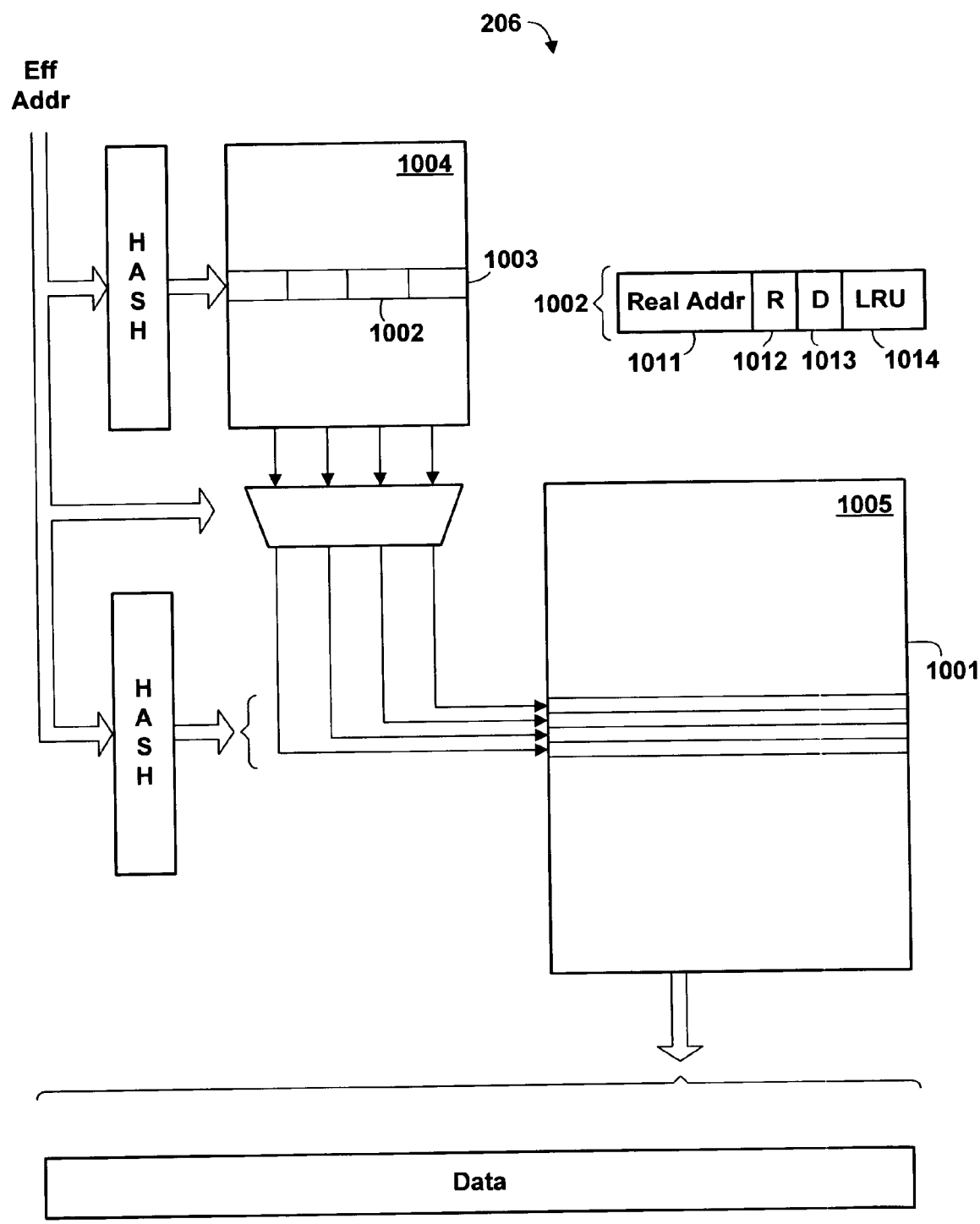
FIG. 10 represents the structure of an L1 cache, according to the preferred embodiment.

FIG. 10 is a representation of the structure of an L1 cache, according to the preferred embodiment. The structure of L1 I-cache 205 and L1 D-cache 206 are similar, and either could be represented by FIG. 10, except that L1 I-cache usually does not require a dirty bit 1013, instructions typically being unwritable in the L1 I-cache. Referring to FIG. 10, L1 cache comprises a cache data table 1005 and an index 1004. The data table 1005 contains multiple lines of data 1001, which in the preferred embodiment each contain 128 bytes. Index 1004 contains rows of index entries 1002. Each index entry contains a real address of a cache line, and certain control bits, specifically, a reference bit 1012, a dirty bit 1013, and LRU bits 1014. A cache line is referenced by hashing a portion of the real address of the desired data to obtain a row 1003 of the index, comparing the real addresses of the index entries in the row to the input referenced address, and if there is a match, selecting the cache line corresponding to the row and index entry position.

Reference bit 1012 is used to indicate whether a cache line has been referenced. The bit is set to 0 when the line is initially loaded, and is set to 1 if the line is ever referenced while in the cache. In the case of a load responsive to a cache miss, the bit may be set to 1 immediately without first being set to 0, depending on the hardware implementation. With the exception of reference bit 1012, the elements of L1 cache are conventional.

Figure 11:
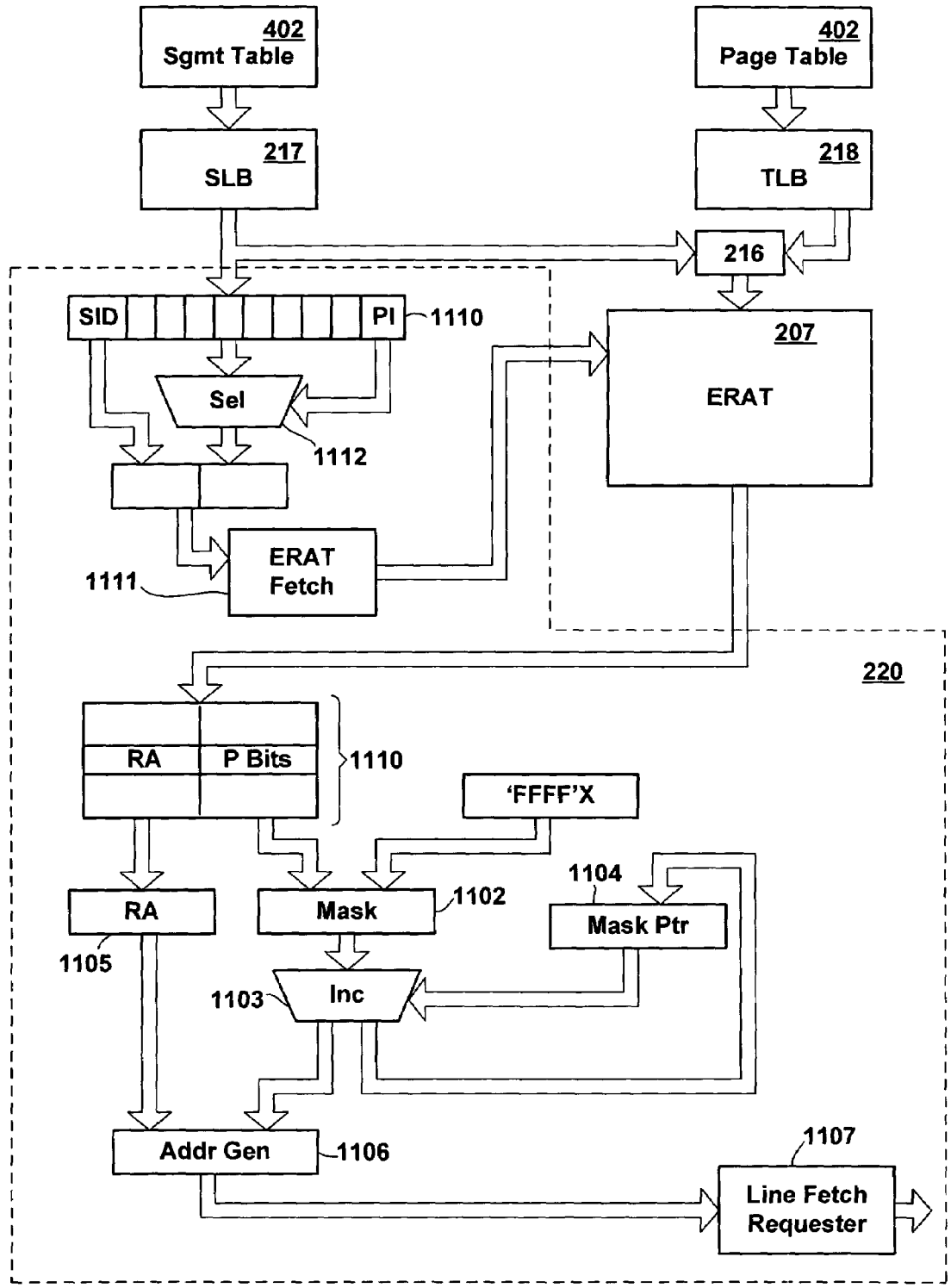
FIG. 11 represents the structure of a pre-fetch engine, showing how the pre-fetch engine interacts with various other hardware, according to the preferred embodiment.

FIG. 11 is a representation of the structure of pre-fetch engine 220, showing how the pre-fetch engine interacts with various other hardware, according to the preferred embodiment. In the preferred embodiment, pre-fetch engine has hardware performing two separate but related functions. A first function pre-fetches data to a cache, such as L1 or L2 cache. A second function pre-fetches address translation information to address translation structures, and in particular ERAT 207. Although both functions are implemented in a single machine in accordance with the preferred embodiment, the present invention does not necessarily require the implementation of the first function as described herein. The first function is the subject of related co-pending application Ser. No. 10/675,732 to David A. Luick, entitled "Apparatus and Method for Pre-Fetching Data to Cached Memory Using Persistent Historical Page Table Data" filed the same date as the present application.

Referring to FIG. 11, an ERAT entry contains a set of pre-fetch bits 915 for cache lines in the page. When a new entry is loaded into the ERAT, or in some instances, when an existing ERAT entry is referenced for the first time (having previously been loaded), the real address and corresponding P bits are placed in cache line pre-fetch queue 1101. In the preferred embodiment, the cache line pre-fetch queue is a FIFO queue holding 16 real addresses and corresponding P-bit sets, although this number could vary.

Pre-fetch engine operates at a low priority to steal bus cycles not normally used. When the bus is idle an address increment amount is generated in increment hardware 1103 using P-bits in mask register 1102 and a mask pointer 1104. Mask pointer 1104 is incremented by 1, and if the bit position of the mask register 1102 corresponding to the value of the mask pointer is '1', the address generator 1106 concatenates the real page number from register 1105 with the mask register value and with a fixed low order bit value of '00'X, to produce a real address on a 256 byte boundary, i.e., an address of an L2 cache line, or a pair of L1 cache lines. The address is input to cache line fetch requester 1107, which initiates a load to cache of the addressed cache line(s).

Another part of the pre-fetch engine copies an SLB entry into a page pre-fetch register 1110. Selector 1112 selects a page from the page reference list of the SLB entry, based on the current page index. The selected page address is concatenated with its corresponding virtual segment ID to form a virtual page address for pre-fetch by ERAT pre-fetch requester 1111. The ERAT pre-fetch requester initiates a pre-fetch of the corresponding ERAT entry from the TLB (or page table, as necessary). Once a page address entry is pre-fetched to ERAT, the ERAT entry may cause the pre-fetch engine to initiate cache line pre-fetch of selected cache lines in the page.

In the preferred embodiment, cache line fetch requester 1107 can load to selective levels of cache. The level of cache to which data is loaded may depend on different factors, such as machine state, type of data, what caused the pre-fetch action, the page reference count, etc. In the exemplary embodiment described herein, typical of commercial transaction processing, data is loaded into the L2 cache if the ERAT entry from which the pre-fetch address is derived was pre-fetched into the ERAT without actually being referenced, and is loaded into the L1 cache if the ERAT entry was demand loaded (i.e., loaded in response to an ERAT miss), or if it was pre-fetched earlier and has been referenced for the first time. However, in certain types of applications, such as scientific computing, it is much more difficult to do meaningful pre-fetching at the granularity of cache lines. In such environments, it is preferable to pre-fetch larger blocks of data (such as a page or more) to some lower cache level, such as the L3 cache. For this purpose, mask register 1102 has an alternative input of 'FFFF'X, which has the effect of pre-fetching all cache lines within a page. Typically, when all cache lines of a page are pre-fetched, they are not pre-fetched to L1 cache, but to some lower level of cache. Further variations of pre-fetching may alter the level or granularity of pre-fetches, depending on the type of data. In general, instruction data is more predictable than database or similar data, and may be pre-fetched more aggressively (i.e., to a higher level). Still further variations of pre-fetching may alter the level or granularity of pre-fetches based on the page reference count. A high reference count means that, once a page is loaded to ERAT, it is usually referenced. In this case, a higher level of cache pre-fetching, such as to L1 cache, may be morejustified than in the case of a low page reference count. A pre-fetch engine in accordance with the present invention may implement any or all of these variations, alone or in combination, or may implement other variations.

FIGS. 12–18 are flow diagrams illustrating the steps taken by various system components to support cache addressing and pre-fetching of data, in accordance with the preferred embodiment. While FIGS. 12–18 are in the form of flow diagrams, it will be understood that, in the preferred embodiment, these steps are performed by hardware components. It will further be understood that, in an actual embodiment, certain steps are performed in parallel with other steps, that steps might be performed in a different sequence than illustrated, and that the sequential order of steps shown in the figures is used only for ease of understanding the logic flow, and is not necessarily meant to indicate a temporal relationship. Some of the steps shown in the flow diagrams are conventional but are shown nevertheless to provide context for the present invention. It will further be understood that some steps not essential to understanding the present invention have been omitted for clarity.

Figure 12:
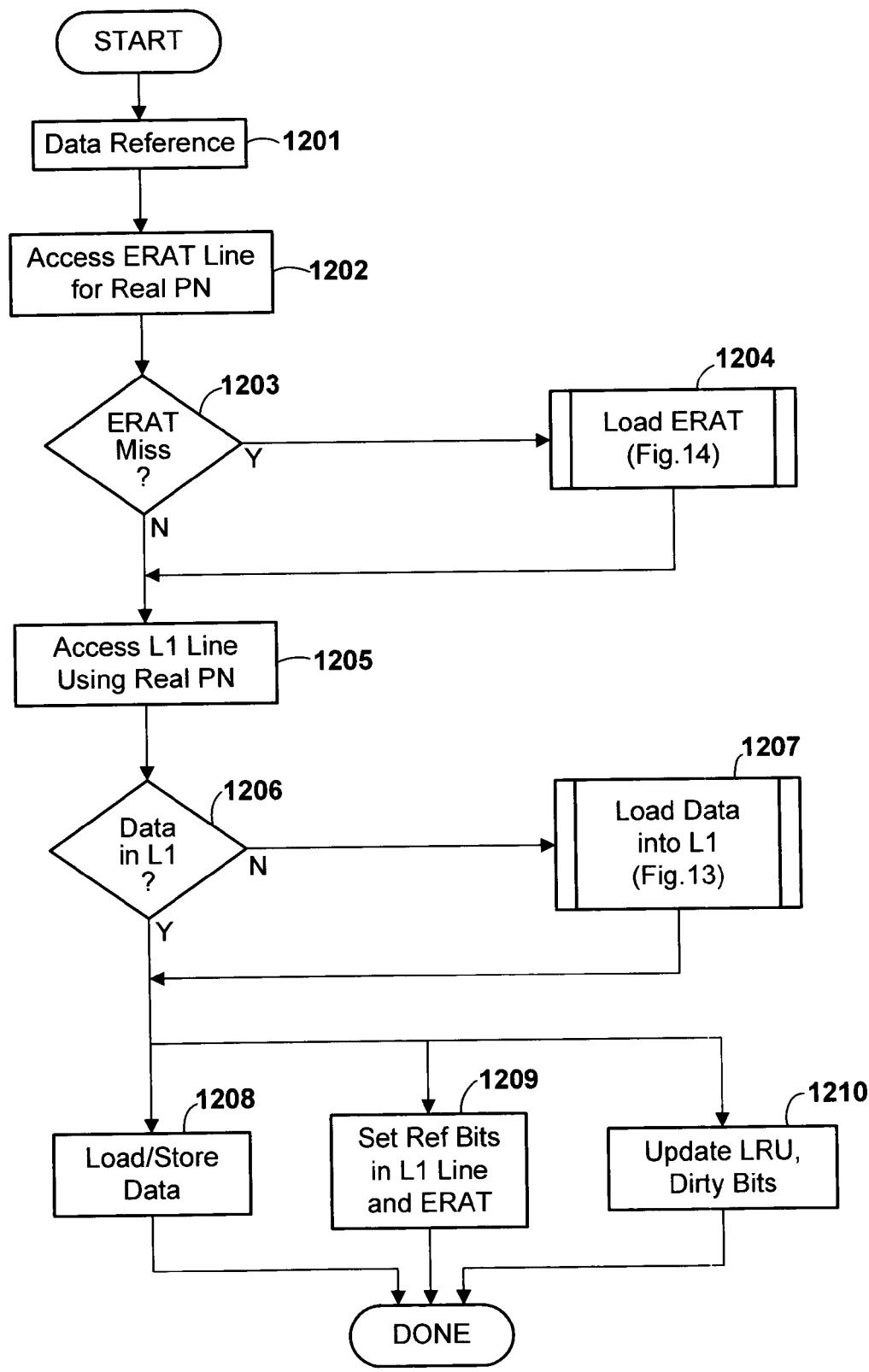
FIG. 12 is a flow diagram illustrating at a high level of actions taken by system components to provide data responsive to a data reference address generated by the processor, according to the preferred embodiment.

Referring to FIG. 12, processor 101 generates an effective address of a data reference (block 1201), which could be an address of an instruction it requires, or an address of data to be loaded to a register as an operand, or data to be stored from a register back to memory. The processor generates a hash function of the effective address to access a line 902 of ERAT 207 to obtain a real page number (block 1202). The entries 901 in the accessed line are compared with the effective address to find a match (block 1203). If no match is found (an ERAT miss), the "Y" branch is taken from block 1203 to block 1204. In this case, the required ERAT entry 901 must be generated and loaded. Generation and loading of the ERAT entry is represented in FIG. 12 as block 1204, and is illustrated in greater detail in FIG. 14.

Figure 13:
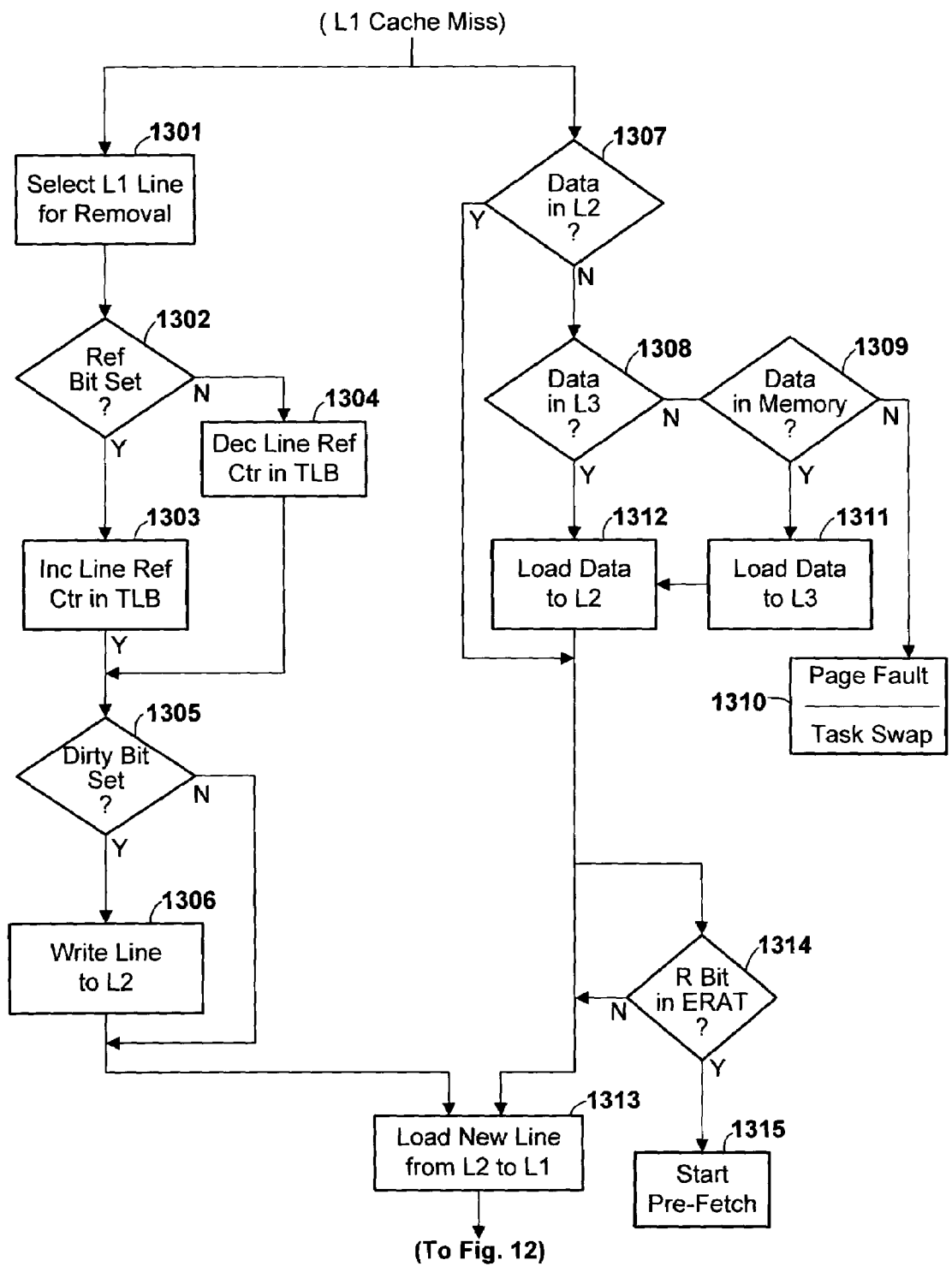
FIG. 13 is a flow diagram illustrating the actions taken by system components to provide required data an the L1 cache, according to the preferred embodiment.
Figure 14:
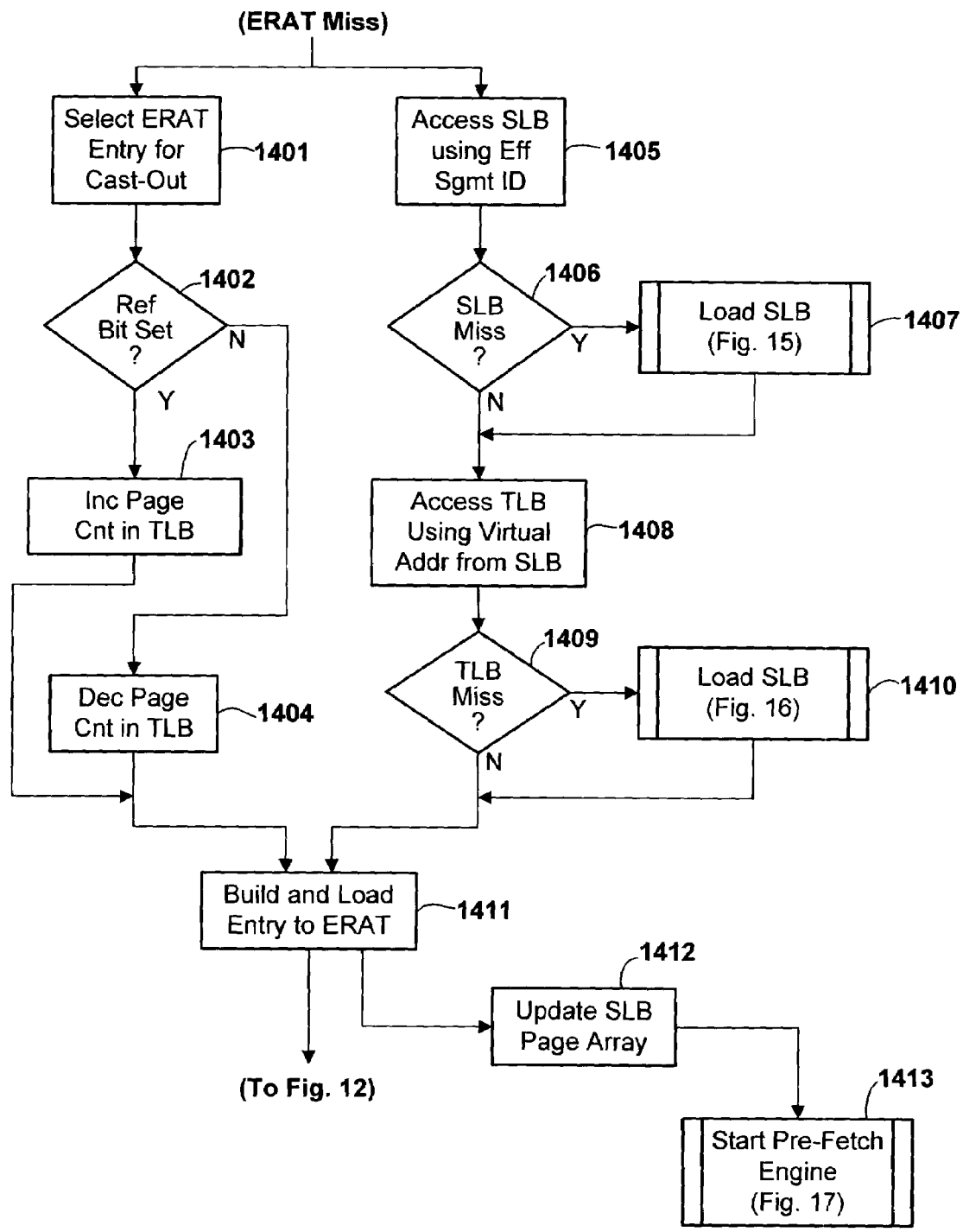
FIG. 14 is a flow diagram illustrating the actions taken by system components to provide a required page entry in the ERAT, according to the preferred embodiment.

If the required address is in the ERAT (the "N" branch from block 1203), or after loading it to the ERAT as shown in FIG. 14, the processor accesses a line of the applicable L1 cache (I-cache 205 or D-cache 206, as the case may be) using some bits of the real page number from the ERAT entry (block 1205). If the required data is not in the L1 cache, the "N" branch is taken from block 1206. In this case, the required data must be obtained from a lower level cache or from memory. Obtaining and loading the required data into L1 is represented in FIG. 12 as block 1207, and is illustrated in greater detail in FIG. 13.

After obtaining the correct data entry in the L1 cache, the processor performs the required operation, e.g., a load of the data to an instruction buffer or register, or a store of data in a register to L1 cache (block 1208). The processor also sets the reference bit 1012 for the accessed line of L1 cache, and the reference bit 916 for the accessed page in the ERAT (block 1209). These bits are used to indicate that a reference has in fact been made to the corresponding cache line or page. The processor further updates LRU bits 1014 and/or dirty bit 1013 for the L1 cache line as necessary (block 1210). These last three operations may be performed concurrently or in any order. The data reference is then complete.

If, at block 1206, the required data was not in the L1 Cache, it is loaded to the L1 cache. This procedure is shown in FIG. 13.

Referring to FIG. 13, upon a cache miss in the L1 cache, the processor needs to do two things: obtain a line of data for the L1 cache containing the requested data reference, and remove, or "cast-out", an existing cache line to make room for the new data. These two operations may proceed concurrently or in parallel, as shown in FIG. 13.

In order to remove an existing line, a line is first selected for removal using any available method, which in the preferred embodiment is the least recently used entry as indicated by LRU bits 1014 (block 1301). If the reference bit 1012 in the line selected for removal is set (the "Y" branch from block 1302), then the processor increments the reference counter 615 in TLB 218 corresponding to the cached line being removed (block 1303). If the reference bit 1012 is not set (the "N" branch from block 1302), then the processor decrements the corresponding reference counter 615 in TLB (block 1304). Although TLB access may be relatively slow, the update of the reference counter only affects record keeping in the TLB, and other operations, specifically the loading of new data into L1 cache, need not wait for completion of the reference counter update. If the dirty bit 1013 in the line selected for removal is set (the "Y" branch from block 1305), then the selected line is written out to L2 cache (block 1306). If the dirty bit is not set (the data has not been changed), block 1306 is by-passed. Preferably, the L1 I-cache contains no dirty bit, so in the case of an L1 I-cache miss, steps 1305 and 1306 are skipped.

To obtain new data, the real address previously obtained from the ERAT is used to access the L2 cache. If the required data is in the L2 cache (the "Y" branch from block 1307), the data is forthwith fetched and loaded to the selected line of L1 cache (block 1313). If the data is not in L2 cache, the processor checks the L3 cache (block 1308), loads data from L3 if it is there (block 1312), and proceeds. If data is not in the L3 cache (the "N" branch from block 1308), main memory is accessed. If the data is in main memory (the "Y" branch from block 1309), it is loaded into L3 cache (block 1311), and then loaded into L2 (block 1312) and L1 (block 1313). If the requested data is not in main memory (the "N" branch from block 1309), a page fault is generated (block 1310) to obtain the data from storage. Due to the long latency of obtaining data from storage, the executing task is generally swapped out.

Concurrently with fetching and loading new data into the L1, the page reference bit 916 for the referenced page in the ERAT is checked (block 1314). If this bit is set off, then the current data reference is the first data reference to this page since the ERAT entry was loaded. I.e., the ERAT entry was loaded as a pre-fetch activity. Generally, in this case data within the page was pre-fetched into L2 or lower cache. Now that an actual reference has occurred to the page, there is a more immediate need for data within other cache lines of the same page, so it should be pre-fetched to the L1 cache. Therefore, the pre-fetch engine is started, represented in FIG. 13 as block 1315, and shown in greater detail in FIG. 17. The pre-fetch engine operating at a low priority, it may have to wait on other operations to actually complete pre-fetching of data.

Referring again to FIG. 12, if, at block 1203, the effective address of the reference could not be found in ERAT 207, the address must be loaded to the ERAT. This procedure is shown in FIG. 14. Similarly to the case of a cache miss, the processor needs to cast out an existing ERAT entry to make room for the new one, and generate a new ERAT entry by accessing SLB 217 and TLB 218. These two operations may proceed concurrently or in parallel, as shown in FIG. 14.

In order to remove an existing ERAT entry, an entry is first selected for removal using LRU bits 914 (block 1401). If the page reference bit 916 in the selected entry is set (the "Y" branch from block 1402), then the processor increments the page reference counter 616 in TLB 218 corresponding to the page entry being removed (block 1403). If the reference bit 914 is not set (the "N" branch from block 1402), then the processor decrements the corresponding page reference counter 616 in TLB (block 1404).

To generate and load a new ERAT entry, the effective segment ID of the data reference generated by the processor is used to index an entry in SLB 217 (block 1405). If the required segment is in the SLB (the "N" branch from block 1406), the SLB entry is used to translate the effective segment ID to its corresponding virtual segment ID, which is then used to index an entry in TLB 218 (block 1408). If the segment is not in the SLB (the "Y" branch from block 1406), the required SLB entry is first loaded into the SLB from a segment table 403 in main memory (represented in FIG. 14 as block 1407, and shown in greater detail in FIG. 15).

Upon indexing an entry in the TLB, if the required page address is in the TLB (the "N" branch from block 1409), an ERAT entry is built from the information in the TLB and SLB, and loaded into the selected location in the ERAT (block 1411). If the page address is not in the TLB, (the "Y" branch from block 1409), the required TLB entry is first loaded into the TLB from the page table 402 (represented in FIG. 14 as block 1410 and shown in greater detail in FIG. 16), after which the ERAT entry is built and loaded (block 1411).

Upon loading the ERAT with the new entry, the processor continues to block 1205 to attempt to access the L1 cache. Although this is shown as the logical next step in the figures, in reality an ERAT miss almost always means a cache miss as well, and in some processor designs, it is possible to start fetching data into the L1 cache on the assumption of a cache miss before the ERAT finishes loading.

Concurrently with loading the ERAT, the page reference history array 817 in the SLB is updated, as necessary (block 1412). I.e., if automatic reference enable bit 815 is set on, then the page address being loaded into ERAT is compared with the array entries in SLB. If the page being loaded into ERAT is already in array 817, then its page reference counter 819 is updated by taking the page reference counter 616 from TLB 218 and incrementing it, to account for the ERAT miss (the counter 616 in TLB is not updated at this time). If the page is not already in array 817, then the incremented value of the page reference counter 616 from TLB 218 for the page being loaded is compared to the page reference counters 819 currently in array 817 to determine whether any of the pages in array 817 should be replaced by the page being loaded into ERAT. If the incremented value of the page reference counter of the page being loaded is greater than the page reference counter 819 of any page in array 817, then the page having the lowest such counter value is replaced in array 817 with the page being loaded into ERAT. In this way, the page reference history array is under continual maintenance, and will change responsive to actual data reference patterns.

Ideally, the order of the pages in array 817 corresponds to the order in which the pages are used by the executing task. Two possible techniques can be used, alone or in combination, to maintain the proper order. In the first technique, if a page being brought into the ERAT due to an ERAT miss is already on the list, it can be assumed that it did not get pre-fetched soon enough. In this case, its position on the list is swapped with the immediately preceding entry on the list. Continued swapping over time will tend to move the earlier referenced pages forward on the list. In the second technique, when adding a new page to array 817, the page is inserted at the location corresponding to the current value of the page index pointer 816, shifting the other page numbers right or left, as the case may be, as many positions as necessary to overwrite the page entry to be replaced. The page index pointer indicates the progress of pre-fetching to the ERAT through the array 817 of page numbers. A page before the current page index pointer has already been pre-fetched to the ERAT (or, at least, pre-fetch has started). A page after the current page index pointer has not yet been pre-fetched. Therefore, the current value of the page index pointer provides a crude approximation of the order of the new page in the sequence of page pre-fetches. Both of these techniques require additional hardware support, and are considered optional features.

Figure 17:
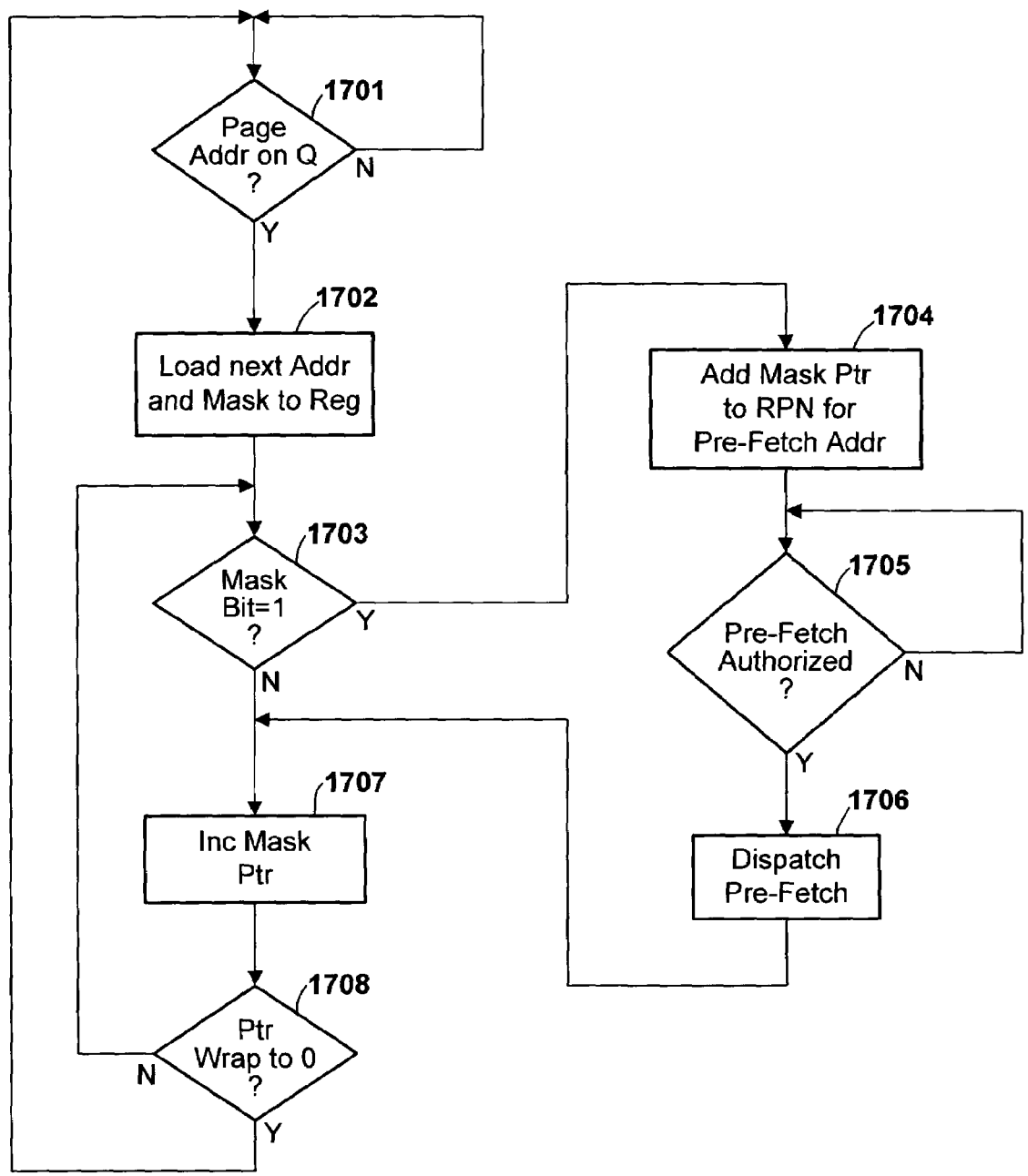
FIG. 17 is a flow diagram illustrating the operation of a pre-fetch engine for pre-fetching cache lines, according to the preferred embodiment.

The loading of data into the ERAT at block 1411 also starts the pre-fetch engine, represented in FIG. 14 as block 1413, and shown in greater detail in FIG. 17. The pre-fetch engine operating at a low priority, it may have to wait some time to actually complete pre-fetching of data.

Figure 15:
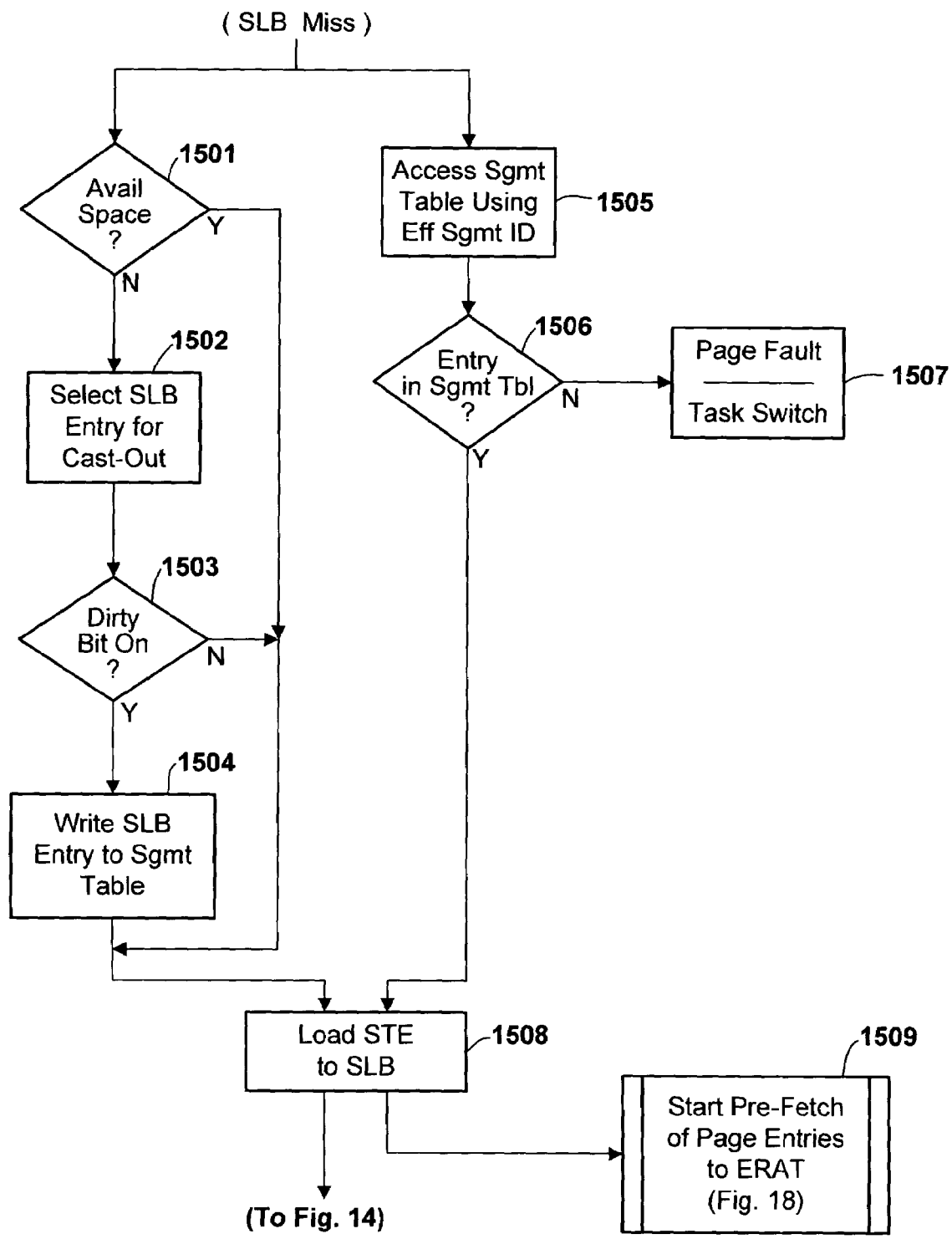
FIG. 15 is a flow diagram illustrating the actions taken by system components to provide a required segment entry in the SLB, according to the preferred embodiment.

If, at block 1406, the required segment entry was not in SLB 217, the entry must be loaded to SLB. This procedure is shown in FIG. 15. Similarly to the case of an ERAT miss, the processor needs to make room for the new entry, and generate a new SLB entry by accessing a segment table 403 in main memory. These two operations may proceed concurrently or in parallel, as shown in FIG. 15.

Since there are typically only a small number of active segment entries, there may be unused space in the SLB for loading a new entry, in which case blocks 1502–1504 are by passed. If there is no unused space in the SLB, the "N" branch is taken from block 1501. The processor then selects an SLB entry for removal using control bits 815, which may be LRU bits or data supporting some other cast-out technique (block 1502). If the dirty bit 820 is set on ("Y" branch from block 1503), the SLB entry selected for cast-out is first saved to the corresponding segment table 403 in main memory (block 1504). The dirty bit might be on because, among other things, page reference history array 817 was updated while the entry was in the SLB. If the dirty bit is not on, it is not necessary to do anything further to cast out the SLB entry; the new entry will overwrite the old one.

To obtain the new entry for SLB 217, the segment table 403 in main memory corresponding to the executing thread which caused the SLB miss is accessed using the effective segment ID of the data reference (block 1505). If the required segment table entry is not in the segment table (the "N" branch from block 1506), the segment table entry must first be loaded from storage, and a page fault is generated, which generally causes the executing task to be swapped out (block 1507). In reality, because the number of segment entries used by a typical task is rather small (often occupying only a single page), it is common to load all segment entries for a task in the segment table when the task is initiated, so that a subsequent page fault does not usually occur. However, there will be some applications having wide reference patterns, where page faults in the segment table can occur. Assuming the required entry is in the segment table (the "Y" branch from block 1506), it is loaded to SLB (block 1508), and the processor continues to block 1408 of FIG. 14 to attempt to access the TLB.

Figure 18:
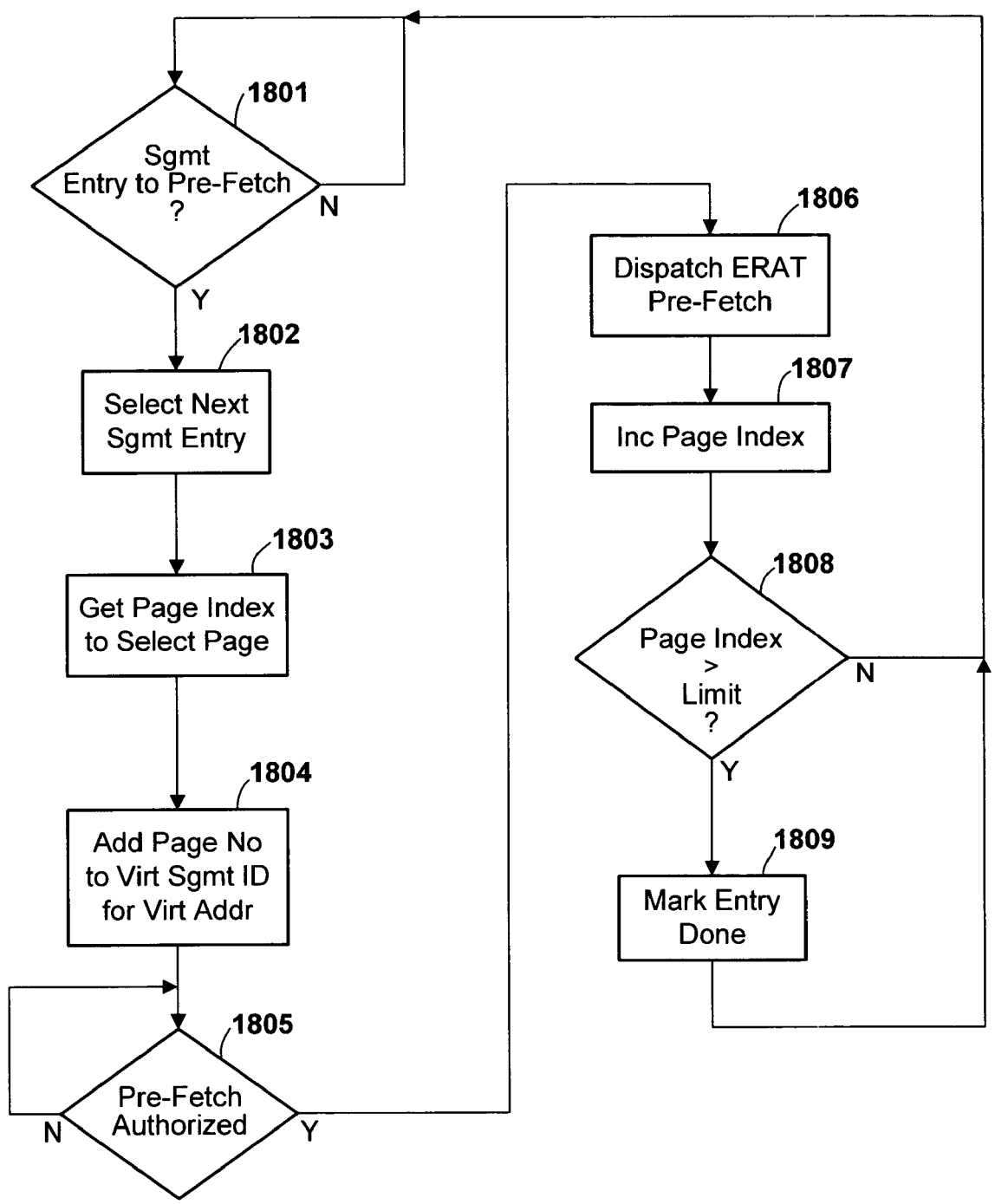
FIG. 18 is a flow diagram illustrating the operation of a pre-fetch engine for pre-fetching ERAT entries, according to the preferred embodiment.

Upon loading the new entry in the SLB, the ERAT pre-fetch function of the pre-fetch engine is started, represented in FIG. 15 as block 1509, and shown in greater detail in FIG. 18. The ERAT pre-fetch function pre-fetches page entries into the ERAT using the page reference array 817 of the newly loaded SLB entry, as described in greater detail herein. This function operates at a low priority, and may need to wait for other events before completion.

Figure 16:
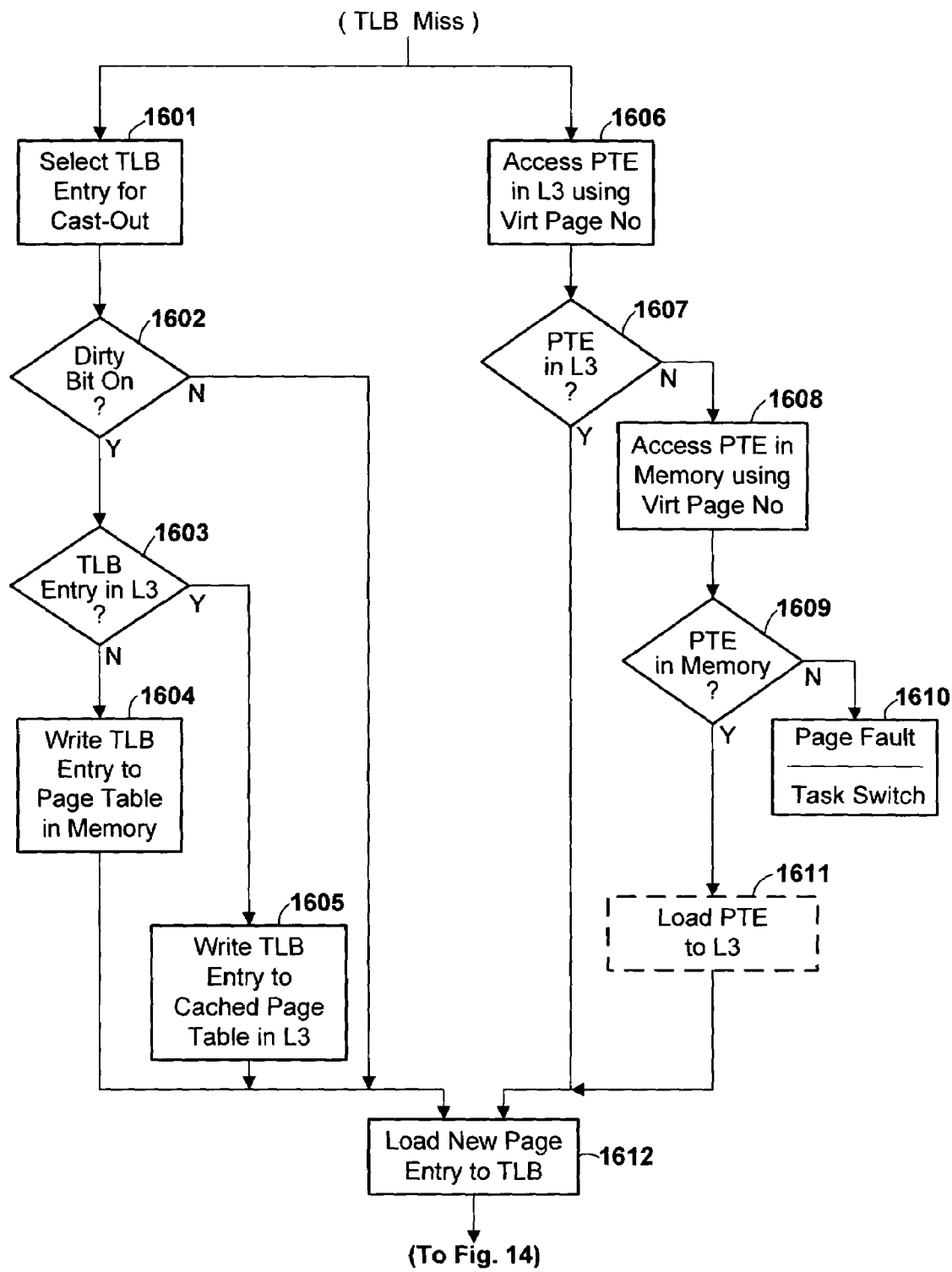
FIG. 16 is a flow diagram illustrating the actions taken by system components to provide a required page entry in the TLB, according to the preferred embodiment.

Referring again to FIG. 14, if at block 1410, the required page entry was not in TLB 218, the entry must be loaded to TLB. This procedure is shown in FIG. 16. Similarly to the case of an ERAT miss, the processor needs to make room for the new entry, and obtain a new TLB entry by accessing page table 402 in memory or a cached portion of the page table in L3 cache. These two operations may proceed concurrently or in parallel, as shown in FIG. 16.

The processor selects a TLB entry for cast-out in accordance with any conventional technique using control bits 613 and/or other data (block 1601). If the dirty bit 617 is set on ("Y" branch from block 1602), the TLB entry selected for cast-out is first saved. The dirty bit will frequently be on as a result of changes to page reference counter 616 and/or line reference counters 615. If the dirty bit is on, the processor determines whether the TLB entry is in L3 cache (block 1603). If so, the selected entry is written out to some portion of the page table in L3 cache (block 1604); otherwise it is written out to the page table in main memory (block 1605). If the dirty bit is not on, it is not necessary to do anything further after block 1602 to cast out the TLB entry, since the new entry will overwrite the old one.

To obtain the new entry for TLB 218, the processor attempts to access a page table entry in L3 cache using the virtual page number (virtual segment ID from the SLB and the page number generated by the processor) (block 1606). If the page table entry is not in L3 cache (block 1607), the processor attempts to access the entry in main memory (block 1608). If the entry is not in main memory (block 1609), a page fault is generated, and the executing task is swapped out (block 1610). If the page entry is returned from main memory (the "Y" branch from block 1609), it may optionally be loaded into L3 cache (block 1611). Whether returned from L3 cache or main memory, the page table entry responsive to the virtual page number is loaded as a new page entry in TLB (block 1612), and the processor continues to block 1411 of FIG. 14.

In the preferred embodiment, on an ERAT miss, and on certain L1 cache misses, the pre-fetch engine 220 is "started", in order to pre-fetch cache lines, as represented by blocks 1315 in FIG. 13 and 1413 in FIG. 14. "Starting" the pre-fetch engine to pre-fetch cache lines means that an entry is added to the cache line pre-fetch queue 1101. The pre-fetch engine retrieves entries from the queue in FIFO order. The steps taken by the processor, and particularly the pre-fetch engine, to pre-fetch cache lines are shown in greater detail in FIG. 17.

Referring to FIG. 17, the pre-fetch engine waits at block 1701 until there is at least one page address entry in the pre-fetch queue 1101. Although block 1701 is shown as an idle loop typical of software, it will be understood that, since the pre-fetch engine is hardware, it simply responds to a signal if present and does not respond if absent. Each page address entry in queue 1101 comprises data derived from an ERAT entry, specifically a real page number and an array of P bits 916. A queue entry preferably includes at least one bit indicating the destination cache of the pre-load. Specifically, in the preferred embodiment, a pre-fetch initiated as a result of an ERAT miss or an L1 cache miss to any location on the page being pre-fetched results in pre-fetching to the L1 cache, while a pre-fetch initiated as a result of pre-fetching entries to the ERAT based on segment table data results in a pre-fetching to the L2. A queue entry may include other data as well for more complex pre-fetching determinations.

If there is an entry in the queue, the oldest entry is selected and loaded to real page register 1105 and mask register 1102 (block 1702). The mask pointer 1104 is initially set to 0. If the mask bit in mask register 1102 pointed to by the mask pointer is '1' (block 1703), the address generator 1106 concatenates the real page address from register 1105, with the mask pointer value, and with a fixed low order bit value of '00'X, to produce a pre-fetch address (block 1704). This pre-fetch address is a real address on a 256 byte boundary, i.e., an address of an L2 cache line, or a pair of L1 cache lines.

Cache line pre-fetch requester 1107 then waits until it is authorized to proceed with the pre-fetch operation (block 1705). Cache pre-fetching should occur in the background, without significant disruption of other activities. Pre-fetch is only predictive, and naturally must take a lower priority than data fetch operations in response to actual cache misses. Therefore, if other data fetch operations are using the available buses or other resources, the pre-fetch requester will wait. Moreover, because pre-fetch operations typically require multiple resources and multiple cycles to complete, it is not always possible to determine in advance whether pre-fetching will cause some other operation to idle during a later cycle. In order to avoid excessive interference with other processes, pre-fetching operations are preferably "paced", according to any now known or later developed pacing technique. Pacing simply means that there is some limit on the frequency of pre-fetch operations, even if resources appear to be available to satisfy a pre-fetch request. In a simple pacing technique, fetch requester will wait until a pre-determined cycle count has elapsed since the last pre-fetch operation was dispatched.

When fetch requester is authorized to proceed, it dispatches the pre-fetch request using the previously generated pre-fetch address (block 1706) and the bits in the queue entry which indicate a pre-fetch destination. Dispatching the request means generating signals causing data at the requested address to be fetched to the designated cache. In general, this follows the same procedure as any other data fetch.

Upon dispatching the pre-fetch request (or if blocks 1704–1706 are by-passed because the mask bit was '0' at block 1703), the mask pointer is incremented (block 1707). If incrementing does not cause the pointer to wrap to 0 (the "N" branch from block 1708), the pre-fetch engine continues to block 1703 to process the next cache line in the current page. If the pointer wraps to 0 (the "Y" branch from block 1708), all cache lines in the current page have been processed, and the pre-fetch engine returns to block 1701.

In the preferred embodiment, the pre-fetch engine also performs pre-fetching of page entries to the ERAT, which can further trigger pre-fetching of cache line entries within these pages. Pre-fetching of page entries to the ERAT is accomplished by pre-fetching pages in page reference history arrays 817 in SLB entries. The SLB entries chosen for initiating pre-fetch are rotated on a round-robin basis. I.e., each SLB entry can specify multiple virtual pages in array 817, each of which is a potential pre-fetch target. A pre-fetch operation is dispatched from a first SLB entry, then the next SLB entry is selected and the next operation dispatched from it. Each successive SLB entry having uncompleted pre-fetch pages will be selected and have one operation dispatched, before returning to the first SLB entry.

The "starting" of the pre-fetch engine for fetching a page entry merely means that some control bit or other information in the SLB entry is set indicating available pages to pre-fetch to ERAT. In due course, the SLB entry should be selected and one or more of its page addresses in array 817 pre-fetched to ERAT. The steps taken by the processor, and particularly the pre-fetch engine, to pre-fetch page entries are shown in greater detail in FIG. 18.

Referring to FIG. 18, the pre-fetch engine waits at block 1801 until there is at least one segment entry in the SLB having pages to pre-fetch queue. Although block 1801 is shown as an idle loop typical of software, it will be understood that, since the pre-fetch engine is hardware, it simply responds to a signal if present and does not respond if absent. In typical operation, a segment table is loaded all at once when a task is started, and multiple entries will be placed in the SLB to start the task. These multiple entries will initially create a large backlog of pre-fetch operations.

If there is at least one entry for pre-fetch in the SLB, the next entry is selected (block 1802). Selection works in a round robin manner, and may be accomplished, e.g., by incrementing a pointer in the SLB, and checking an appropriate bit to see if there are any page pre-fetch operations incomplete. The selected entry is loaded to register 1110.

Selector 1112 selects a virtual page number from the array of page numbers 818 in the selected entry (block 1803). The virtual page number selected is the number corresponding to the value of page index pointer 816. A virtual address is then constructed by concatenating the virtual segment ID of the selected entry, the selected virtual page number, and low-order zero bits ('000'X) to form a page boundary (block 1804).

ERAT pre-fetch requester 1111 then waits until it is authorized to proceed with the ERAT pre-fetch operation (block 1805). As in the case of cache line pre-fetching, ERAT pre-fetching occurs in the background, and should not only defer to other operations, but be paced, as described above with respect to cache line requests. In general, ERAT pre-fetching takes a lower priority than cache line pre-fetching on an L1 or ERAT miss.

When the ERAT fetch requester is authorized to proceed, it dispatches the pre-fetch request using the previously generated pre-fetch address (block 1806). Dispatching the request means generating signals causing an address entry to be fetched and generated for the ERAT. In general, this follows the same procedure as a fetch on an ERAT miss.

Upon dispatching the pre-fetch request, the page index pointer in the selected entry in SLB is incremented (block 1807). If the page index pointer has wrapped past its limit (block 1808), then all pages on the page list of this entry have been pre-fetched to ERAT. In this case, the entry is no longer enqueued, i.e., a control bit or other data is set to indicate that all pages have been pre-fetched (block 1809). If the limit is not reached, the entry will be selected again when the pointer wraps around to the entry's location in SLB.

In the description above, it has been assumed that every SLB entry contains a list of pages for pre-fetch. In fact, some SLB entries may contain no pages on the list or fewer than a full list of pages. Because the list is a fixed length, an absence of a pre-fetchable page or some number of pre-fetchable pages fewer than the fixed length of array 817 may be indicated by a page reference count of zero, or by some control bit or bits.

When an ERAT entry is loaded into the ERAT responsive to a pre-fetch request, this action may further cause individual cache lines within the page addressed by the ERAT entry to be pre-fetched, as described earlier.

In the description above, it will be noted that line reference counts and page reference counts are decremented only on an unused pre-fetch, i.e., if the data is pre-fetched, but never used while in cache or ERAT. This means that if the count is below the threshold for pre-fetching, it can never be decremented. As a result, it will slowly increment until it reaches the threshold (assuming the data stays in memory). Where the threshold is one, as is the threshold for cache line pre-fetching in the preferred embodiment, this doesn't matter. However, it defeats the purpose of a higher threshold, and may interfere with proper operation of the array of pages to be pre-fetched to ERAT in SLB entries. Accordingly, an optional aging mechanism could be applied to the page reference counts used for pre-fetching ERAT entries. Such a mechanism might include, e.g., decrementing a page count when a page table entry is loaded from memory into TLB, or on the occurrence of some other relatively infrequent event. Such an aging mechanism would cause the page counts of rarely used data to remain near zero, even if the data is never pre-fetched. Analogous aging mechanisms could be used to decrement the line reference counts associated with cache lines within the page table entries.

Although various data structures, and in particular the page table and segment table, are illustrated herein having a table-like structure for clarity, in fact the structures may be more complex, and data "entries" in these structures may be fragmented, so that portions of an entry are in one location and other portions in another location.

In the preferred embodiment, the list of pages in the segment table is automatically constructed using page reference counters, as described herein. Page reference counters are up-or-down counters which are incremented if a page entry is referenced while in the ERAT, and decremented if it is pre-fetched to the ERAT and not referenced. However, it will be understood that such counters could be incremented and decremented on different events, and might be incremented and decremented by different amounts for different events. Furthermore, reference history data for a page need not be an up-or-down counter. It might be so simple as a single bit, which is set to 1 or 0 depending on some recent event. E.g., the bit might be set to 1 if the most recent load to cache was successful (i.e., the data was used), and set to 0 if not. It might alternatively be a set of bits, each corresponding to some different recent event. Furthermore, a list of pages might be maintained by other means than a page reference counter. For example, the list of pages might be determined by performance analysis of program reference patterns. Alternatively, the list might be so simple as a list of pages which were referenced the last time a program was invoked.

In the preferred embodiment, a page entry is pre-fetched into ERAT if the page is on the list in the segment table. However, the pre-fetch decision could be more complex, and take into account the values of the page reference counters or other parameters. For example, the processor could pre-fetch to a TLB a counter exceeds a low threshold, and pre-fetch to ERAT if a counter exceeds a higher threshold. The reference counters can also control the selective pre-fetching of data within a page to one or more cache levels. Furthermore, thresholds could be variable depending on the current load on the system and other factors.

In the preferred embodiment, each segment table entry corresponds to a page. However, the granularity of segment table entries could vary, and each entry could span multiple pages, or possible some other measure.

In the preferred embodiment, a computer system uses a three-level addressing scheme, in which effective addresses are translated to virtual addresses, which in turn are translated to real addresses, when accessing cache or memory. However, the present invention is not limited to any particular addressing scheme, and would be applicable to systems having fewer than three levels of addressing, or more than three levels of addressing.

Although a specific embodiment of the invention has been disclosed along with certain alternatives, it will be recognized by those skilled in the art that additional variations in form and detail may be made within the scope of the following claims,

What is claimed is:

1. A digital data processing device, comprising:
a memory divisible into a plurality of pages, said memory containing a segment table and a page table separate from said segment table, said segment table having a plurality of segment table entries corresponding to respective segments in a first address space, each said segment containing a respective integral number of said pages of said memory, wherein, for at least some said segments, the respective integral number is greater than one, each segment table entry containing pre-fetch data identifying a plurality of sub-units of the corresponding segment as pre-fetch candidates, each said sub-unit of the corresponding segment being an integral number of said pages;
at least one processor;
at least one structure for temporarily storing data from said memory in a location more accessible to said processor than said memory is accessible to said processor; and
a pre-fetch engine, said pre-fetch engine performing at least one pre-fetch action, said at least one pre-fetch action comprising pre-fetching selective data with respect to a sub-unit of said plurality of sub-units of a segment from said memory into said at least one structure for temporarily storing data, said pre-fetch engine selecting said selective data for pre-fetching using said pre-fetch data in said segment table.

2. The digital data processing device of claim 1, wherein said pre-fetch action comprises pre-fetching address translation data with respect to said sub-unit into at least one address translation cache structure.

3. The digital data processing device of claim 2, wherein said at least one address translation cache structure comprises a translation look-aside buffer.

4. The digital data processing device of claim 2, wherein said at least one address translation cache structure comprises an effective-to-real address translation table (ERAT).

5. The digital data processing device of claim 1, wherein said digital data processing device automatically generates said pre-fetch data.

6. The digital data processing device of claim 5, wherein said pre-fetch data comprises a plurality of up-or-down counters corresponding to respective sub-units of the corresponding segment, each up-or-down counter being incremented on the occurrence of at least one pre-defined event of a first set with respect to the corresponding sub-unit and being decremented on the occurrence of at least one pre-defined event of a second set with respect to the corresponding sub-unit.

7. The digital data processing device of claim 6,
wherein each said up-or-down counter is incremented if data with respect to the corresponding sub-unit is loaded into a first structure for temporarily storing data, and a data reference is made to said corresponding sub-unit while the data is in said first structure for temporarily storing data; and
wherein each said up-or-down counter is decremented if data with respect to the corresponding sub-unit is loaded into said first structure for temporarily storing data, and no data reference is made to said corresponding sub-unit while the data is in said first structure for temporarily storing data.

8. The digital data processing device of claim 1, wherein said sub-unit is a page of memory.

9. The digital data processing device of claim 1, wherein said segment table translates segment identifiers in an effective address space of an executing task to segment identifiers in a global virtual address space, and wherein a page table translates segment identifiers in the global virtual address space to pages in said memory.

10. The digital data processing device of claim 1, wherein said pre-fetch action is performed responsive to an occurrence of an event of a first type.

11. The digital data processing device of claim 10, wherein said event of said first type comprises generating a reference to data within the corresponding segment.

12. A processor for a digital data processing device, comprising:
an instruction unit determining instruction sequences;
an execution unit executing instructions in said instruction sequences;
at least one cache structure for temporarily storing data from a memory of said digital data processing device for use by at least one of said instruction unit and said execution unit;
a pre-fetch engine, said pre-fetch engine performing at least one pre-fetch action, said at least one pre-fetch action comprising pre-fetching selective data with respect to a sub-unit of a plurality of sub-units of a segment from said memory into said at least one cache structure for temporarily storing data, said pre-fetch engine selecting said selective data for pre-fetching using pre-fetch data associated with respective segments in said memory, said pre-fetch data identifying a plurality of sub-units of a corresponding segment as pre-fetch candidates;
wherein said sub-unit is an integral number of panes of memory.

13. The processor for a digital data processing device of claim 12, wherein said pre-fetch action comprises pre-fetching address translation data with respect to said sub-unit into at least one address translation cache structure.

14. The processor for a digital data processing device of claim 12, wherein said sub-unit is a page of memory.

15. The processor for a digital data processing device of claim 12, wherein said pre-fetch action is performed responsive to an occurrence of an event of a first type.

16. The processor for a digital data processing device of claim 15, wherein said event of said first type comprises generating a reference to data within the corresponding segment.

17. A processor for a digital data processing device, comprising:
an instruction unit determining instruction sequences;
an execution unit executing instructions in said instruction sequences;

at least one cache structure for temporarily storing data from a memory of said digital data processing device for use by at least one of said instruction unit and said execution unit;

a pre-fetch engine, said pre-fetch engine performing at least one pre-fetch action, said at least one pre-fetch action comprising pre-fetching selective data with respect to a sub-unit of a plurality of sub-units of a segment from said memory into said at least one cache structure for temporarily storing data, said pre-fetch engine selecting said selective data for pre-fetching using pre-fetch data associated with respective segments in said memory, said pre-fetch data identifying a plurality of sub-units of a corresponding segment as pre-fetch candidates;

wherein said pre-fetch data comprises a plurality of up-or-down counters corresponding to respective sub-units of the corresponding segment, each up-or-down counter being incremented on the occurrence of at least one pre-defined event of a first set with respect to the corresponding sub-unit and being decremented on the occurrence of at least one pre-defined event of a second set with respect to the corresponding sub-unit.

18. The processor for a digital data processing device of claim 17, wherein each said up-or-down counter is incremented if data with respect to the corresponding sub-unit is loaded into a first structure for temporarily storing data, and a data reference is made to said corresponding sub-unit while the data is in said first structure for temporarily storing data; and wherein each said up-or-down counter is decremented if data with respect to the corresponding sub-unit is loaded into said first structure for temporarily storing data, and no data reference is made to said corresponding sub-unit while the data is in said first structure for temporarily storing data.

19. A method for pre-fetching data within a digital data processing device, said digital data processing device having an addressable memory divisible into a plurality of pages, comprising:

associating with each of a plurality of segments of a first address space of said digital data processing device, a respective plurality of sub-units of the corresponding segment, each said sub-unit of the corresponding segment being an integral number of said pages;

determining that a processor has generated a reference to an address within a first segment of said plurality of segments; and responsive to said determining step, initiating at least one pre-fetch action with respect to said first segment, said at least one pre-fetch action comprising pre-fetching selective data with respect to each sub-unit of the plurality of sub-units associated with said first segment by said associating step.

20. The method for pre-fetching data of claim 19, wherein said pre-fetch action comprises pre-fetching address translation data with respect to each said sub-unit of the plurality of sub-units associated with said first segment into at least one address translation cache structure.

21. The method for pre-fetching data of claim 20, wherein said pre-fetch action further comprises pre-fetching at least some data within each of a plurality of said sub-units associated with said first segment responsive to pre-fetching said address translation data.

* * * * *